(12) United States Patent
Masai

(10) Patent No.: US 7,791,836 B2
(45) Date of Patent: Sep. 7, 2010

(54) THIN FILM MAGNETIC DEVICE HAVING STRIP-SHAPED MAGNETIC FILMS WITH THEIR MAGNETIZATION EASY AXES ARRANGED ORTHOGONAL TO A THIN FILM COIL AND METHOD OF MANUFACTURING THE SAME

(75) Inventor: Taku Masai, Tokyo (JP)

(73) Assignee: TDK Corporation, Tokyo (JP)

( * ) Notice: Subject to any disclaimer, the term of this patent is extended or adjusted under 35 U.S.C. 154(b) by 726 days.

(21) Appl. No.: 11/730,152

(22) Filed: Mar. 29, 2007

(65) Prior Publication Data

US 2007/0230043 A1 Oct. 4, 2007

(30) Foreign Application Priority Data

| Mar. 31, 2006 | (JP) | ................. 2006-098628 |
| Mar. 31, 2006 | (JP) | ................. 2006-098629 |
| Mar. 31, 2006 | (JP) | ................. 2006-098630 |
| Feb. 27, 2007 | (JP) | ................. 2007-047170 |
| Feb. 27, 2007 | (JP) | ................. 2007-047171 |
| Feb. 27, 2007 | (JP) | ................. 2007-047172 |

(51) Int. Cl.
*G11B 5/17* (2006.01)
*H01F 17/04* (2006.01)

(52) U.S. Cl. ............................ 360/123.01; 360/123.14; 360/123.19; 336/221

(58) Field of Classification Search ................................ 360/123.01–123.61, 317–324.2; 336/221
See application file for complete search history.

(56) References Cited

U.S. PATENT DOCUMENTS 5,801,521 A * 9/1998 Mizoguchi et al. .......... 323/282

FOREIGN PATENT DOCUMENTS

| JP | A 08-172015 | 7/1996 |
| JP | A 2001-143929 | 5/2001 |

* cited by examiner

*Primary Examiner*—A. J. Heinz
(74) *Attorney, Agent, or Firm*—Oliff & Berridge, PLC

(57) ABSTRACT

The present invention provides a thin film magnetic device realizing effective improvement in magnetic permeability in a high frequency area. The thin film magnetic device includes a thin film coil and a plurality of strip-shaped magnetic films disposed along a plane in which the thin film coil extends. The plurality of strip-shaped magnetic films are disposed to extend in one direction only in a pair of areas facing each other. The pair of areas is selected from four areas obtained by dividing, in the winding direction, the area where the thin film coil extends.

31 Claims, 22 Drawing Sheets

Me

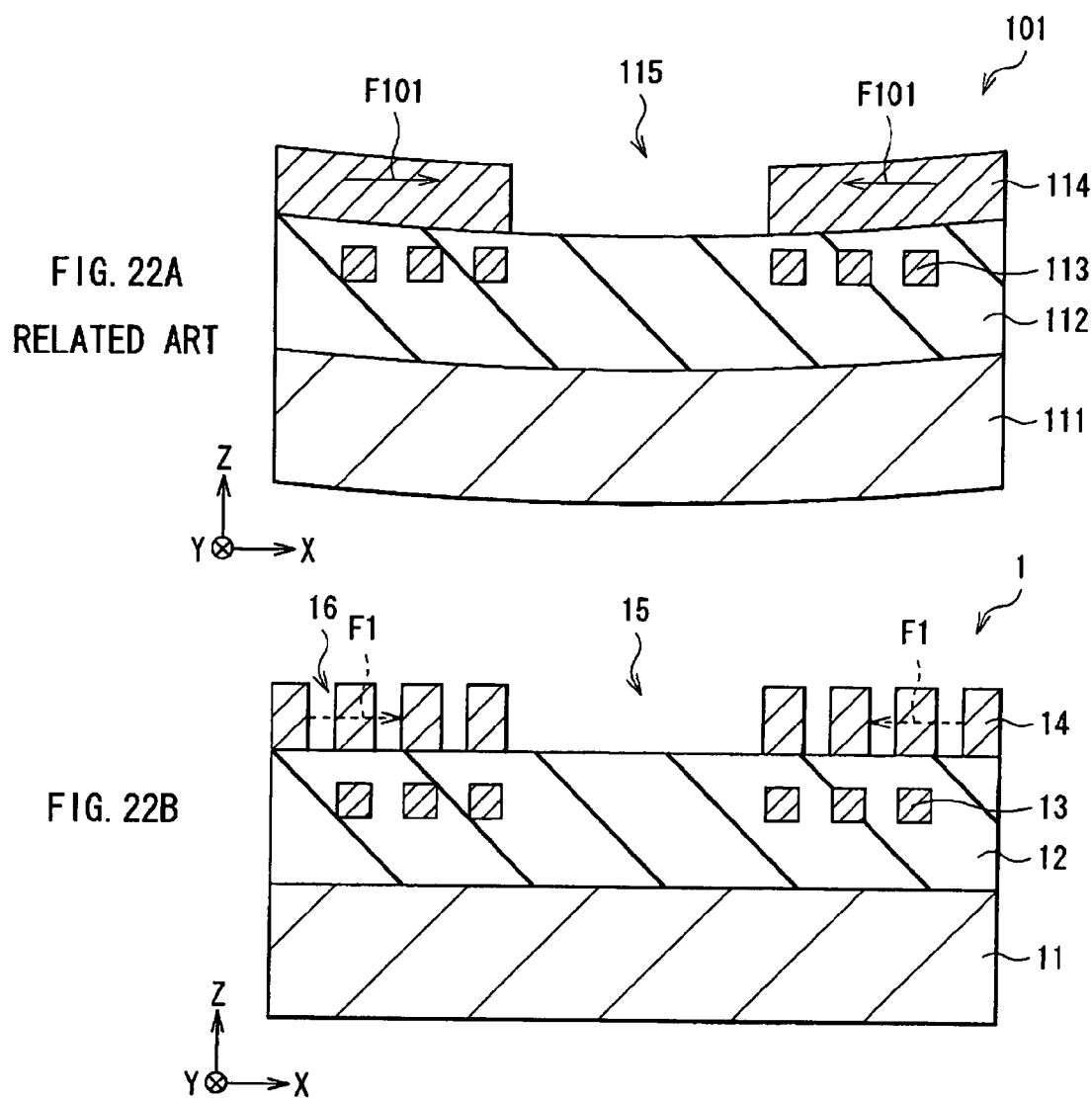

THIN FILM MAGNETIC DEVICE HAVING STRIP-SHAPED MAGNETIC FILMS WITH THEIR MAGNETIZATION EASY AXES ARRANGED ORTHOGONAL TO A THIN FILM COIL AND METHOD OF MANUFACTURING THE SAME

BACKGROUND OF THE INVENTION

1. Field of the Invention

The present invention relates to a thin film magnetic device having a thin film coil and a magnetic film and a method of manufacturing the same.

2. Description of the Related Art

Hitherto, in the field of electronic devices for various uses, a thin film magnetic device such as a thin film inductor or a thin film transducer including a thin film coil and a magnetic film is widely used as an integrated passive component.

FIGS. 27A and 27B show an example of a conventional thin film magnetic device (thin film inductor 101) constructed by a rectangular spiral coil. FIG. 27A shows a configuration in plan view, and FIG. 27B shows a configuration in cross section taken along line III-III of FIG. 27A. The thin film inductor 101 has a stack structure including, in order in the Z axis direction, an insulating film 112, a rectangular spiral coil 113 having terminals 113T1 and 113T2, and a magnetic film 114 having an opening 115 in its center portion over a substrate 111. In the magnetic film 114, by application of a predetermined magnetic field in the X axis direction at the time of film formation or the like, a magnetization easy axis Me is formed in the magnetic field application direction (X axis direction), and a magnetization hard axis Mh is formed in a direction (Y axis direction) orthogonal to the magnetization easy axis Me, thereby displaying uniaxial anisotropy.

In recent years, high frequency applications in the GHz (gigahertz) band and the like of such a thin film magnetic device are expected. A magnetic film having excellent high frequency characteristics, concretely, a magnetic film having high magnetic permeability in a high frequency area is in demand.

For example, in a conventional thin film magnetic device as shown in FIGS. 27A and 27B, the thin film coil is a rectangular spiral coil. Consequently, coil parts extending in the X axis direction and the Y axis direction exist, and both of the coil parts extending along the magnetization easy axis Me and the magnetization hard axis Mh exist. Therefore, the magnetic permeability of the coil part (in the X axis direction) whose magnetization direction generated by the coil is orthogonal to the magnetization easy axis Me is originally low in a low frequency area but can be maintained to certain extent in a high frequency area. On the other hand, the magnetic permeability of the coil part (in the Y axis direction) whose magnetization direction is parallel with the magnetization easy axis Me is high in the low frequency area but it drops abruptly in the high frequency area. Therefore, the efficiency of use of the magnetic characteristics of the magnetic film is low (in the case of a square spiral coil, about 50%), and it is difficult to achieve high magnetic permeability in the high frequency area.

A technique of improving the magnetic permeability in the high frequency area by forming a plurality of slits in a magnetic film is proposed in, for example, Japanese Unexamined Patent Application Publication (JP-A) Nos. H8-172015 and 2001-143929.

Concretely, JP-A No. H8-172015 discloses a technique such that the magnetization easy axis direction of a magnetic film is varied by using magnetic shape anisotropy of the magnetic film in correspondence with coil parts in two direction of a rectangular spiral coil. More concretely, a magnetic film is separately formed in a magnetic field in correspondence with the coil parts in two directions so that both of the coil parts in two directions become orthogonal to the magnetization easy axis, thereby improving magnetic permeability in the high frequency area.

JP-A No. 2001-143929 discloses a technique such that the magnetization easy axis direction of the magnetic film is rotated by forming fine slits circulating in correspondence with coil parts of a rectangular spiral coil. In a manner similar to the above-described technique, by making both of the coil parts in two directions orthogonal to the magnetization easy axis, the magnetic permeability in the high frequency area is improved.

SUMMARY OF THE INVENTION

The thin film magnetic device disclosed in JP-A No. H8-172015, however, has a problem that the magnetic permeability is low due to stress occurring in the magnetic film. In the thin film magnetic device disclosed in JP-A No. 2001-143929, a plurality of slits are formed in the whole magnetic film. Consequently, there is a problem such that the magnetic permeability is low due to excessive demagnetizing field generated in the magnetic film.

As described above, the conventional techniques has not realized magnetic permeability which is sufficiently high in practical use in the high frequency area due to, for example, the stress occurring in the magnetic film and the influence of demagnetizing field. Therefore, further improvement in the magnetic permeability in the high frequency range is desired.

In the method of manufacturing a thin film magnetic device disclosed in JP-A No. H8-172015, the magnetic film has to be separately formed in correspondence with coil parts in two directions. Consequently, the manufacturing process is more complicated than that of the conventional thin film magnetic device as shown in FIGS. 27A and 27B, and the device is not easily manufactured.

In view of the drawbacks, it is desirable to provide a thin film magnetic device realizing effective improvement in the magnetic permeability in the high frequency area, and a method of manufacturing such a thin film magnetic device.

It is also desirable to provide a method of manufacturing a thin film magnetic device capable of easily obtaining a thin film magnetic device having high magnetic permeability in the high frequency area.

A thin film magnetic device of a first embodiment of the invention comprises a thin film coil and a plurality of strip-shaped magnetic films disposed along a plane in which the thin film coil extends. The plurality of strip-shaped magnetic films are disposed to extend in one direction only in a pair of areas facing each other, the pair of areas being selected from four areas obtained by dividing an area where the thin film coil extends in the winding direction. "The area where the thin film coil extends" is not the area of the thin film coil in a strict sense but an area of the thin film coil and its periphery.

A thin film magnetic device of a second embodiment of the invention comprises a thin film coil and a magnetic film disposed along a plane in which the thin film coil extends. A plurality of slits extending in one direction are formed only in the magnetic film in a pair of areas facing each other, the pair of areas being selected from four areas obtained by dividing, in the winding direction, the area where the thin film coil extends. The "slit" includes not only a strip-shaped or strip-shaped opening but also a strip-shaped or strip-shaped recess.

In the thin film magnetic devices of the first and second embodiments of the invention, the plurality of strip-shaped magnetic films or the plurality of slits in the magnetic film extending in one direction are formed in the plane of the thin film coil. Consequently, addition of the stress in the width direction of each strip-shaped magnetic film or each slit is avoided, and the stress in the strip-shaped magnetic film or the magnetic film decreases. Therefore, the deflection amount of the strip-shaped magnetic film or the magnetic film also decreases, so that the magnetic permeability improves. Since the strip-shaped magnetic films or slits are formed only in a pair of facing areas, the pair of areas being selected from four areas obtained by dividing, along the winding direction, the area where the thin film coil extends, as compared with the case where the strip-shaped magnetic films or slits are formed in all of the four areas, deterioration in the magnetic permeability due to the influence of the demagnetizing field is suppressed. Thus, it is easy to maintain the magnetic permeability to certain extent in the high frequency area.

In the thin film magnetic device of the first embodiment of the invention, preferably, the strip-shaped magnetic film is formed so as to overlap a turn pattern of the thin film coil. In the thin film magnetic device of the second embodiment of the invention, it is preferable to form the slit in an area between turn patterns of the thin film coil. With such configurations, the distance between the strip-shaped magnetic film or the magnetic film and the coil pattern is shortened, so that the magnetic permeability further improves.

In the thin film magnetic device according to the first embodiment of the invention, preferably, the direction of the magnetization easy axis of the strip-shaped magnetic film coincides with the width direction of the strip-shaped magnetic film. In the thin film magnetic device of the second embodiment of the invention, preferably, the direction of a magnetization easy axis of the magnetic film coincides with the width direction of the slit. With such configurations, also in the case where the magnetization easy axis and the thin film coil are parallel or orthogonal to each other, the magnetic permeability is maintained to some extent in the high frequency area. Therefore, the magnetic permeability in the high frequency area improves more effectively.

A thin film magnetic device of a third embodiment of the invention comprises a thin film coil and a plurality of strip-shaped magnetic films disposed along a plane in which the thin film coil extends, and extending in one direction in the plane. The strip-shaped magnetic film has a plurality pairs of first magnetic domains lined up in a longitudinal direction of the strip-shaped magnetic film, each of the pairs of first magnetic domains being disposed at both ends in the width direction of the strip-shaped magnetic film.

A thin film magnetic device of a fourth embodiment of the invention comprises a thin film coil, and a magnetic film disposed along a plane in which the thin film coil extends and having a plurality of slits extending in one direction in the plane. In a strip-shaped areas between the slits in the magnetic film, a plurality pairs of first magnetic domains are lined up in a longitudinal direction of the strip-shaped area, each of the pairs of first magnetic domains being disposed at both ends in the width direction of the strip-shaped area.

In the thin film magnetic devices of the third and fourth embodiments of the invention, the plurality pairs of first magnetic domains are lined up in the longitudinal direction of the strip-shaped magnetic film or the strip-shaped area, each of the pairs of first magnetic domains being disposed at both ends in the width direction of the strip-shaped magnetic film or the strip-shaped area between the slits extending in one direction in the plane. Therefore, the action of increasing the resonance frequency generated by the demagnetizing field is effectively promoted, and the magnetic permeability is maintained to some extent also in the high frequency area.

In the thin film magnetic device of the third embodiment of the invention, the strip-shaped magnetic film has a plurality pairs of second magnetic domains lined up in the longitudinal direction of the magnetic film, each of the pairs of second magnetic domains being disposed between the pair of first magnetic domains. In the fourth thin film magnetic device of the invention, in the strip-shaped area in the magnetic film, second magnetic domains may be lined up in the longitudinal direction of the strip-shaped area between the -pair of first magnetic domains. With such configurations, the action of increasing the resonance frequency generated by the demagnetizing field in the second magnetic domain is effectively promoted, and the magnetic permeability is maintained to some extent in the high frequency area.

In the thin film magnetic devices of the third and fourth embodiments of the invention, the first magnetic domain can be magnetized in the longitudinal direction of the strip-shaped magnetic film or the strip-shaped area. The second magnetic domain can be magnetized in the width direction of the strip-shaped magnetic film or the strip-shaped area.

In the thin film magnetic devices of the third and fourth embodiments of the invention, preferably, the area ratio of the first magnetic domains to the strip-shaped magnetic film or the strip-shaped area is 12% or less. With such configurations, the action of increasing the resonance frequency generated by the demagnetizing field is further promoted, and the magnetic permeability in the high frequency area further improves.

A thin film magnetic device of a fifth embodiment of the invention comprises a thin film coil, and a plurality of strip-shaped magnetic films disposed along a plane in which the thin film coil extends, and extending in one direction in the plane. The strip-shaped magnetic film has a plurality pairs of magnetic domains lined up in a longitudinal direction of the strip-shaped magnetic film, and the longitudinal direction of the magnetic domain coinciding with the width direction of the strip-shaped magnetic film.

A thin film magnetic device of a sixth embodiment of the invention comprises a thin film coil, and a magnetic film disposed along a plane in which the thin film coil extends and having a plurality of slits extending in one direction in the plane. In a strip-shaped area between the slits in the magnetic film, a plurality pairs of magnetic domains are lined up in a longitudinal direction of the strip-shaped area. The longitudinal direction of the magnetic domain coincides with the width direction of the strip-shaped area.

In the thin film magnetic devices of the fifth and sixth embodiments of the invention, a plurality pairs of magnetic domains are lined up in a longitudinal direction of the strip-shaped magnetic film or the strip-shaped area. The longitudinal direction of the plurality of magnetic domains coincides with the width direction of the strip-shaped film or the strip-shaped area between the slits extending in one direction in the plane. Consequently, irrespective of the positional relation between the magnetization easy axis of the strip-shaped magnetic film or the magnetic film and the thin film coil, that is, in both of the cases where they are parallel or orthogonal with each other, the magnetic permeability is maintained to some extent in the high frequency area.

In the thin film magnetic devices of the fifth and sixth embodiments of the invention, preferably, the strip-shaped magnetic film or the slit is formed in only an area where the magnetization easy axis of the strip-shaped magnetic film or the magnetic film and the thin film coil are orthogonal to each other, so that the longitudinal direction coincides with the direction orthogonal to the magnetization easy axis. The "orthogonal" state includes not only a state where the magnetization easy axis and the thin film coil or the like completely are perfectly orthogonal to each other but also a stat where the magnetization easy axis and the thin film coil or the like are almost orthogonal to each other. With the configurations, the magnetic permeability in the area where the magnetization easy axis and the thin film coil are orthogonal to each other increases selectively.

In the thin film magnetic devices of the fifth and sixth embodiment of the invention, when the thin film coil includes: a first coil part extending along the magnetization easy axis; and a second coil part extending along a direction orthogonal to the magnetization easy axis, the strip-shaped magnetic film or the slit can be formed along the second coil part.

In the thin film magnetic devices of the fifth and sixth embodiments of the invention, the width of the strip-shaped magnetic film or the strip-shaped area lies, preferably, in the range between 0.1 mm and 5 mm, more preferably, in the range between 0.3 mm and 2 mm, and further more preferably, the range between 0.3 mm and 1 mm.

In the thin film magnetic device of the fifth and sixth embodiments of the invention, preferably, the ratio of the length in the width direction of the magnetic domain to the length in the longitudinal direction of the magnetic domain is 0.3 or less.

A method of manufacturing the thin film magnetic device of the first embodiment of the invention comprises: a first step of forming a thin film coil over a substrate; and a second step of forming, over the thin film coil, a plurality of strip-shaped magnetic films having a magnetization easy axis in a predetermined direction, the strip-shaped magnetic films being formed in an area where the magnetization easy axis and the thin film coil are orthogonal to each other, the longitudinal direction of the strip-shaped magnetic film coinciding with a direction orthogonal to the magnetization easy axis.

In the method of manufacturing the thin film magnetic device of the first embodiment of the invention, in the first step, a thin film coil is formed over the substrate. In the second step, a plurality of strip-shaped magnetic films are formed along a plane in which the thin film coil extends. The vertical direction of plurality of strip-shaped magnetic films coincides with a direction orthogonal to the magnetization easy axis. The strip-shaped magnetic film is formed in correspondence with the area where the magnetization easy axis of the strip-shaped magnetic film and the thin film coil are orthogonal to each other and the strip-shaped magnetic film extends in the direction orthogonal to the magnetization easy axis. Consequently, not only in the area where the magnetization easy axis and the thin film coil are parallel with each other but also in the area where the magnetization easy axis ad the thin film coil are orthogonal to each other, that is, in the area where the strip-shaped magnetic films extend, the magnetic permeability is maintained to some extent in the high frequency area. The manufacturing process is not complicated by the first and second steps.

A method of manufacturing the thin film magnetic device of the second embodiment of the invention comprises: a first step of forming a thin film coil over a substrate; and a second step of forming, over the thin film coil, a magnetic film having a magnetization easy axis in a predetermined direction, the magnetic film having a plurality of slits in an area where the magnetization easy axis and the thin film coil are orthogonal to each other, the longitudinal direction of the slit coinciding with a direction orthogonal to the magnetization easy axis.

In the method of manufacturing the thin film magnetic device of the second embodiment of the invention, in the first step, a thin film coil is formed over the substrate. In the second step, the magnetic film having slits in a direction orthogonal to the magnetization easy axis is formed along a plane in which the thin film coil extends. Since the slits are formed in correspondence with the area where the magnetization easy axis of the magnetic film and the thin film coil are orthogonal to each other and the magnetic film extends in the direction orthogonal to the magnetization easy axis, not only in the area where the magnetization easy axis and the thin film coil are parallel with each other but also in the area where the magnetization easy axis ad the thin film coil are orthogonal to each other, that is, in the area where the slits extend, the magnetic permeability is maintained to some extent in the high frequency area. The manufacturing process is not complicated by the first and second steps.

In the method of manufacturing the thin film magnetic device of the second embodiment of the invention, the second step may comprise: a step of forming the magnetic film over the thin film, a step of performing heat treatment while applying a magnetic field in a predetermined direction in a plane in which the magnetic film extends, and a step of forming the slits in a direction orthogonal to the application direction of the magnetic field in an area where the application direction of the magnetic field and the thin film coil are orthogonal to each other. The second step may include: a step of forming the magnetic film over the thin film, a step of forming the slits in the magnetic film in parallel with a part of the thin film coil, and a step of performing heat treatment while applying a magnetic field in a direction orthogonal to the slit in a plane in which the magnetic film extends. The second step may comprise: a step of forming the magnetic film over the thin film coil while applying a magnetic field in a predetermined direction in a plane in which the magnetic film extends, and a step of forming the slits in the magnetic film in an area where the application direction of the magnetic field and the thin film coil are orthogonal to each other, the slits extending in a direction orthogonal to the application direction of the magnetic field.

Preferably, the method of manufacturing the thin film magnetic devices of the first and second embodiments of the invention further includes, after the second step, a step of performing heat treatment while applying a magnetic field rotating in the plane in which the strip-shaped magnetic film or the magnetic film are disposed. In this case, the stress in the strip-shaped magnetic film or the magnetic film is relaxed and the magnetic anisotropy decreases, so that the magnetic permeability in the magnetization hard axis direction orthogonal to the magnetization easy axis increases.

As understood from the above description, the following explanation is made. In the present invention In the thin film magnetic devices of the first and second embodiments of the invention, the plurality of strip-shaped magnetic films or the plurality of slits in the magnetic film extending in one direction are formed in the face where the thin film coil extends, and the strip-shaped magnetic films or slits are formed only in a pair of facing areas, the pair of areas being selected from four areas obtained by dividing, along the winding direction, the area where the thin film coil extends. Thus, while reducing the stress in the strip-shaped magnetic films or the magnetic film, decrease in the magnetic permeability due to the influence of the demagnetizing field is suppressed, and the magnetic permeability can be maintained to some extent also in the high frequency area. Therefore, the magnetic permeability in the high frequency area can be improved more effectively.

In the thin film magnetic devices of the third and fourth embodiments of the invention, the plurality pairs of first magnetic domains are lined up in the longitudinal direction of the strip-shaped magnetic film or the strip-shaped area while being disposed at both ends in the width direction of the strip-shaped magnetic film or the strip-shaped area between slits extending in one direction of the plane. Consequently, the action of increasing the resonance frequency generated by the demagnetizing field is effectively promoted, and the magnetic permeability can be maintained to some extent also in the high frequency area. Therefore, the magnetic permeability in the high frequency area can be improved more effectively.

In the thin film magnetic devices of the fifth and sixth embodiments of the invention, a plurality pairs of magnetic domains are lined up in a longitudinal direction of the strip-shaped magnetic film or strip-shaped areas so that the longitudinal direction coincides with the width direction of the strip-shaped magnetic film or the strip-shaped area between slits extending in one direction in the plane. Consequently, in both of the cases where the magnetization easy axis of the strip-shaped magnetic film or the magnetic film and the thin film coil are parallel or orthogonal with each other, the magnetic permeability can be maintained to some extent in the high frequency area. Therefore, the magnetic permeability in the high frequency area can be improved more effectively.

In particular, in the case where the strip-shaped magnetic films or slits are formed in correspondence with only an area where the magnetization easy axis of the strip-shaped magnetic film or the magnetic film and the thin film coil are orthogonal to each other and extend in the direction orthogonal to the magnetization easy axis, the magnetic permeability at high frequencies in the area where the magnetization easy axis and the thin film coil are orthogonal to each other can be increased selectively. Therefore, the magnetic permeability in the high frequency area can be improved more effectively.

In the method of manufacturing the thin film magnetic device of the invention, the strip-shaped magnetic films or the slits are formed in correspondence with the area where the magnetization easy axis of the strip-shaped magnetic film or the magnetic film and the thin film coil are orthogonal to each other and extend in the direction orthogonal to the magnetization easy axis. Consequently, not only in the area where the magnetization easy axis and the thin film coil are parallel with each other but also in the area where the magnetization easy axis ad the thin film coil are orthogonal to each other, that is, in the area where the strip-shaped magnetic films or slits extend, the magnetic permeability is maintained to some extent in the high frequency area. The manufacturing process is not complicated by the first and second steps. Thus, the thin film magnetic device displaying high magnetic permeability in the high frequency area can be easily obtained.

Other and further objects, features and advantages of the invention will appear more fully from the following description.

BRIEF DESCRIPTION OF THE DRAWINGS

FIGS. 22A and 22B are cross sections for explaining a stress reducing effect in the thin film magnetic device shown in FIG. 21.

DETAILED DESCRIPTION OF THE PREFERRED EMBODIMENTS OF THE INVENTION

Best modes for carrying out the present invention (hereinbelow, simply called embodiments) will be described in detail hereinbelow with reference to the drawings.

First Embodiment

Figure 1:
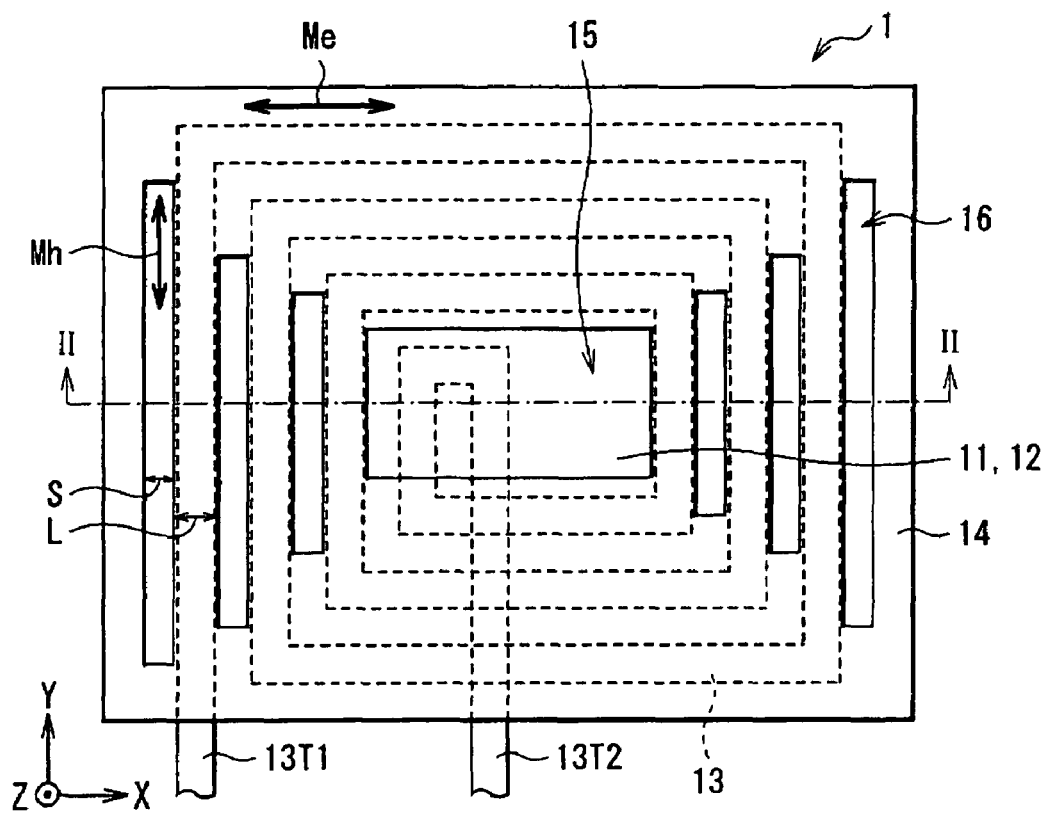
FIG. 1 is a plan view showing a configuration of a thin film magnetic device according to a first embodiment of the invention.
Figure 2:
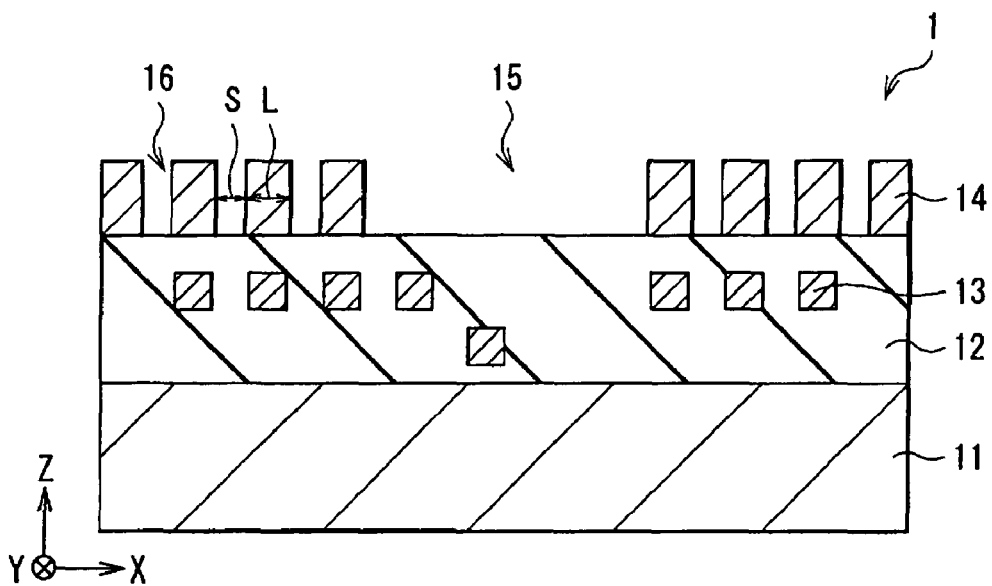
FIG. 2 is a cross section showing a configuration of a thin film magnetic device taken along line II-II of FIG. 1.

FIGS. 1 and 2 show the configuration of a thin film inductor 1 as a thin film magnetic device according to a first embodiment of the present invention. FIG. 1 shows a configuration in an X-Y plane, and FIG. 2 shows a configuration in a section X-Z taken along line II-II of FIG. 1. The thin film inductor 1 has a stack structure including, in order, an insulating film 12, a thin film coil 13, and a magnetic film 14 over a substrate 11.

The substrate 11 is a rectangular-shaped substrate supporting the whole thin film inductor 1 and is made of, for example, glass, silicon (Si), aluminum oxide ($Al_2O_3$, so-called "alumina"), ceramics, semiconductor, resin, or the like. The material of the substrate 11 is not limited to the series of materials but can be freely selected.

The insulating film 12 electrically insulates the coil 13 from the periphery and is made of an insulating material such as silicon oxide ($SiO_2$).

The coil 13 is provided to form an inductor between its one end (13T1) and the other end (13T2) and is made of a conductive material such as copper (Cu). The coil 13 has a rectangular spiral structure wound so that both of the end portions 13T1 and 13T2 are led to the outside in the X-Y plane. The coil 13 has a coil part extending in the X axis direction (first coil part) and a coil part extending in the Y axis direction (second coil part). The end portion 13T2 in the coil 13 is disposed below the winding portion including the end portion 13T1 in the coil 13 so as to be led to the outside without being in contact with the winding portion.

The magnetic film 14 is provided to increase the inductance of the thin film inductor 1 and has a rectangular-shaped opening 15 in its center. The magnetic film 14 has a magnetization easy axis Me in the X axis direction and a magnetization hard axis Mh in the Y axis direction, thereby displaying uniaxial anisotropy. The magnetic film 14 is made of a magnetic material such as a cobalt (Co) alloy, iron (Fe) alloy, or nickel iron alloy (NiFe, so-called permalloy). Preferable examples of the cobalt alloy are cobalt zirconium tantalum (CoZrTa) alloy and cobalt zirconium niobium (CoZrNb) alloy from the viewpoint of practical use of the thin film inductor 1. The shape of the opening 15 is not limited to a rectangular shape but may be any shape.

In the magnetic film 14, a plurality of strip-shaped (band-shaped) slits 16 are formed so as to overlap the second coil parts in a area in which the magnetization easy axis Me and the coil 14 are almost orthogonal to each other, that is, in a area corresponding to the second coil parts extending in the Y axis direction in the coil 14. The slits 16 extend in a direction almost orthogonal to the magnetization easy axis Me, that is, in the Y axis direction (magnetization hard axis Mh direction). From another viewpoint, in the magnetic film 14, a plurality of slits 16 extending in one direction (Y axis direction) are formed only in a pair of areas (two areas positioned on the right and left sides of the opening 15) facing each other, the pair of areas being selected from four areas (four areas positioned on the right and left sides and the upper and lower sides of the opening 15) obtained by dividing an extension area of the coil 13 in the winding direction. The width of each of the slits 16 (slit width S) is about 5 μm to 20 μm, and the width of the magnetic film 14 (pattern width L) between neighboring slits 16 is about 0.1 mm to 5 mm as will be described later. In the embodiment, the slits 16 are formed so as to penetrate the magnetic film 14. The slits 16 do not always have to penetrate magnetic film 14 but may be strip-shaped (band-shaped) recesses.

Figure 3A:
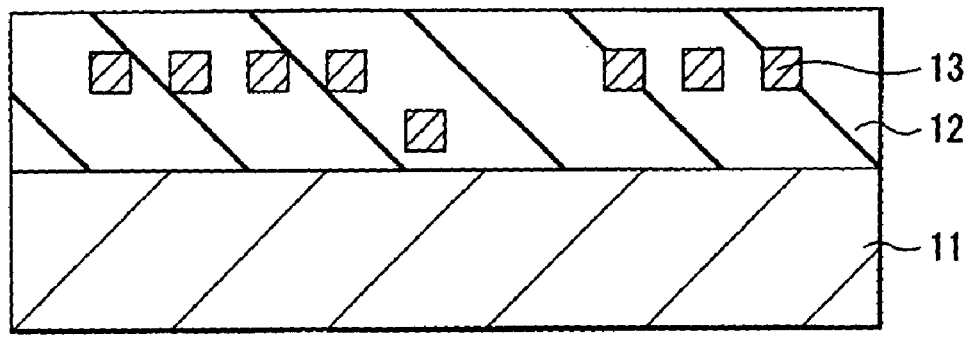
FIGS. 3A and 3B are cross sections illustrating a method of manufacturing the thin film magnetic device shown in FIG. 1.
Figure 3B:
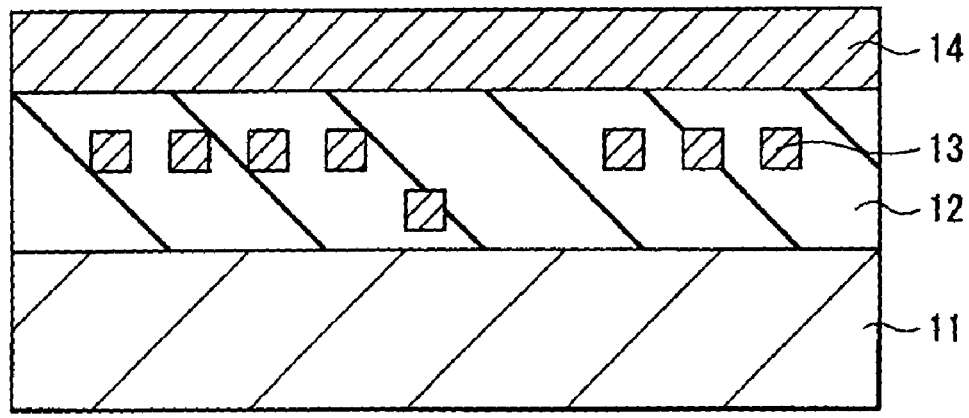

Next, an example of a method of manufacturing the thin film inductor 1 will be described by referring to FIGS. 3A and 3B to FIG. 7. FIGS. 3A and 3B to FIG. 7 show an example of the method of manufacturing the thin film inductor 1. FIGS. 3A and 3B and FIG. 5 show a configuration in the X-Z section. FIGS. 4, 6A, 6B, and 7 show a configuration in the X-Y plane.

As shown in FIG. 3A, the insulating film 12 and the coil 13 are formed over the substrate 11 made of the above-described material. The insulating film 12 is formed by, for example, sputtering. The coil 13 is formed by, for example, plating. Since the coil 13 is buried in the insulating film 12 as shown in the diagram, for example, the coil 13 is formed while forming the insulating film 12.

Subsequently, as shown in FIG. 3B, the magnetic film 14 made of the above-described material is uniformly formed on/over the insulating film 12 and the coil 13. The magnetic film 14 is formed by, for example, sputtering.

Figure 4:
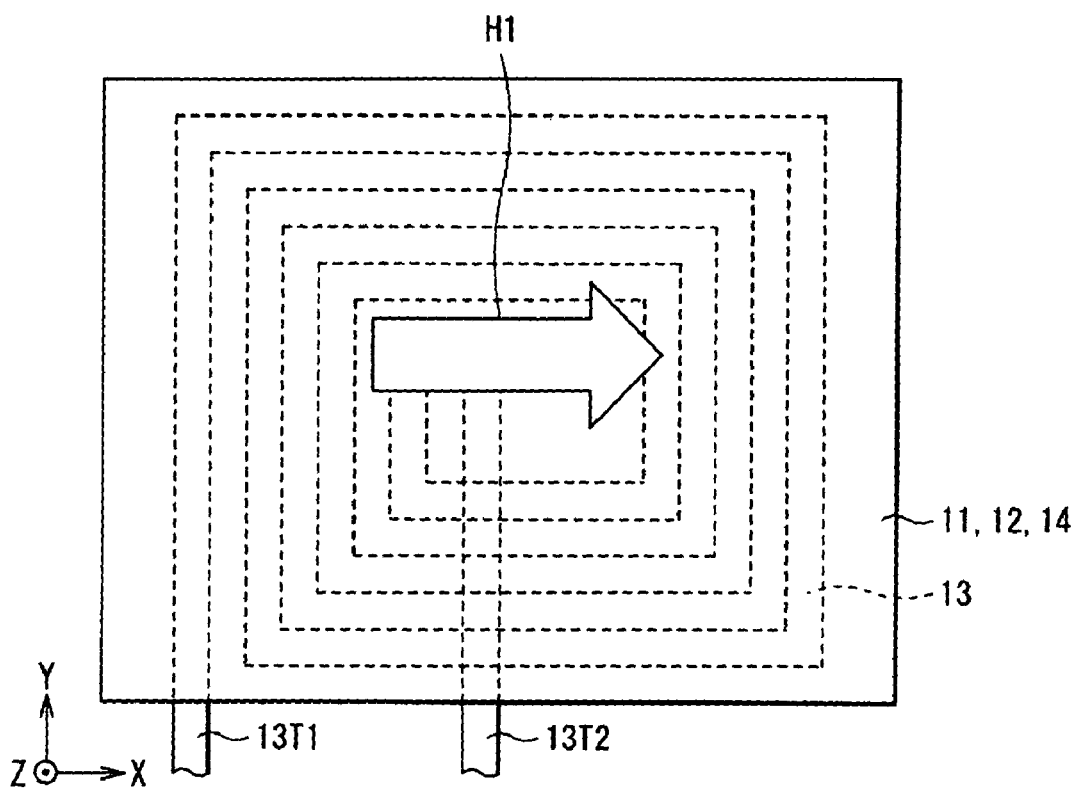
FIG. 4 is a plan view showing the method of manufacturing the thin film magnetic device subsequent to FIGS. 3A and 3B.
Figure 5:
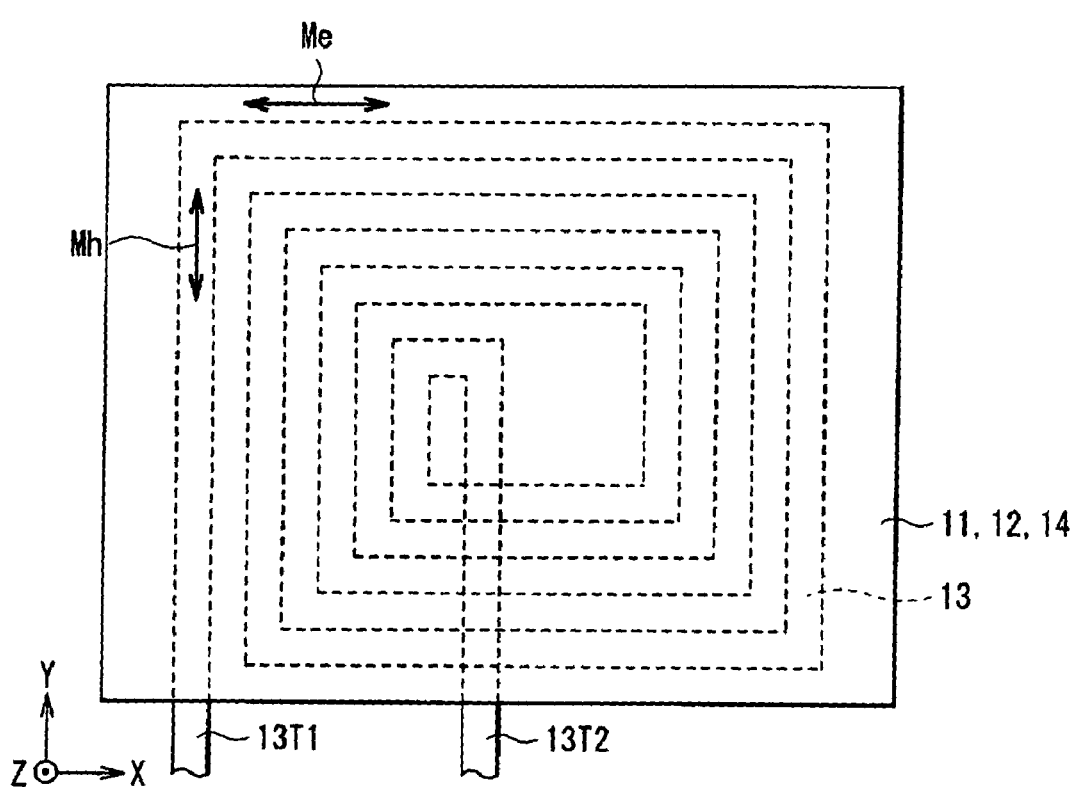
FIG. 5 is a plan view showing the method of manufacturing the thin film magnetic device subsequent to FIG. 4.

As shown in FIG. 4, heat treatment is performed while applying a fixed magnetic field H1 in the plane (X-Y plane) of the magnetic film 14. The application direction of the fixed magnetic field H1 is set almost in parallel with one of the first and second coil parts of the coil 13, that is, the X axis direction or the Y axis direction (the X axis direction in FIG. 4). For example, the intensity of the fixed magnetic field H1 is about $300 \times 10^3/4\pi$ [A/m] (=300 Oe), the heat treatment temperature is about 330° C., and heat treatment time is about one hour. As shown in FIG. 5, the magnetization easy axis Me is generated in the application direction (X axis direction) of the fixed magnetic field H1, and the magnetization hard axis Mh is generated in the direction (Y axis direction) orthogonal to the application direction, so that the magnetic film 14 displays uniaxial anisotropy.

Figure 6A:
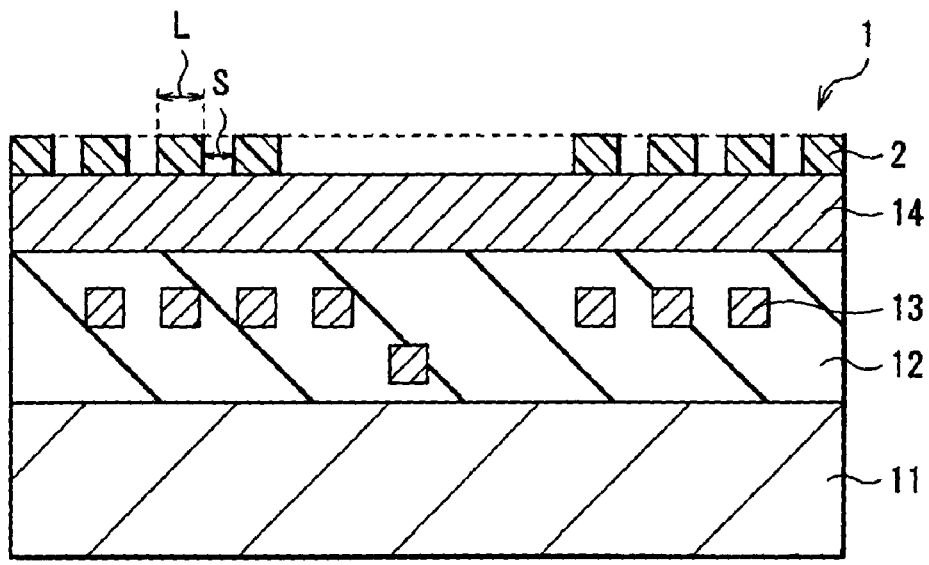
FIGS. 6A and 6B are cross sections showing the method of manufacturing the thin film magnetic device subsequent to FIG. 5.

As shown in FIG. 6A, a photoresist pattern 2 for forming the opening 15 and the slits 16 in the magnetic film 14 is formed by the photoresist technique. The areas for forming the photoresist pattern 2 correspond to the areas for forming the opening 15 and the slits 16. As described above, the center portion in the magnetic film 14 is set as the area for forming the opening 15. The area in which the magnetization easy axis Me and the coil 13 are almost orthogonal to each other, that is, the area corresponding to the second coil part extending in the Y axis direction in the coil 13 is set as the area for forming the slits 16. The plurality of slits 16 having the strip shape (band shape) are formed in the direction almost orthogonal to the magnetization easy axis Me, that is, in the Y axis direction (magnetization hard axis Mh direction).

Figure 6B:
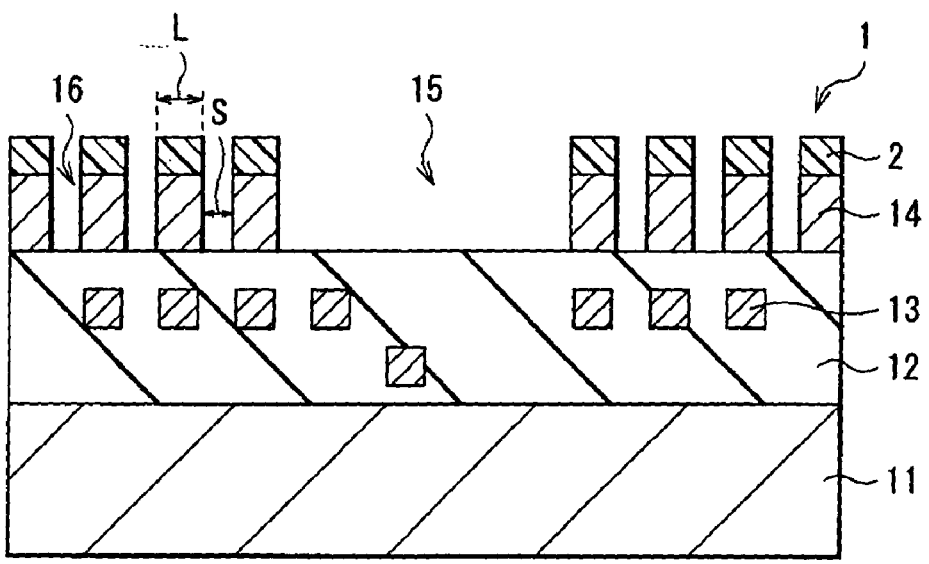

As shown in FIG. 6B, the magnetic film 14 is etched with a predetermined etching material, thereby forming the opening 15 and the slits 16.

Finally, by removing the photoresist pattern 2 with a predetermined resist removing material, the thin film inductor 1 as shown in FIGS. 1 and 2 is manufactured.

Figure 7:
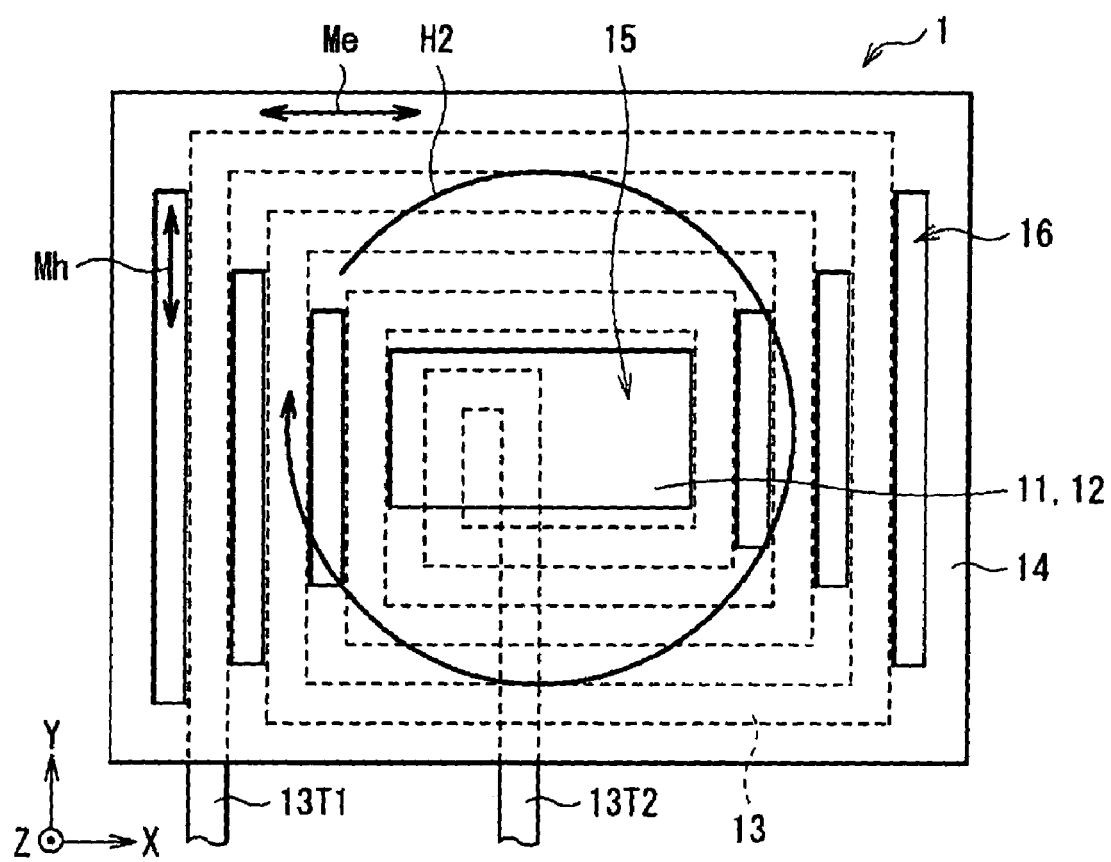
FIG. 7 is a plan view showing the method of manufacturing the thin film magnetic device subsequent to FIGS. 6A and 6B.
Figure 8A:
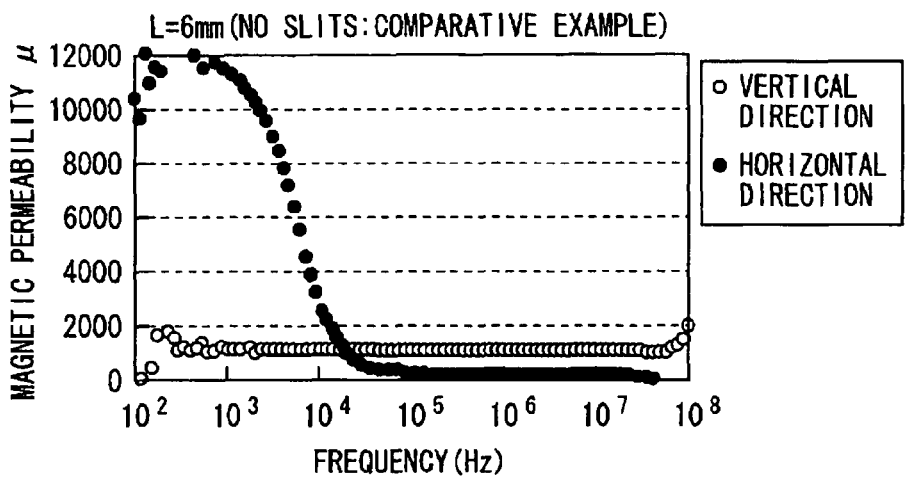
FIGS. 8A to 8C are characteristic diagrams showing an example of the frequency dependency of magnetic permeability in the thin film magnetic device illustrated in FIG. 1.
Figure 8B:
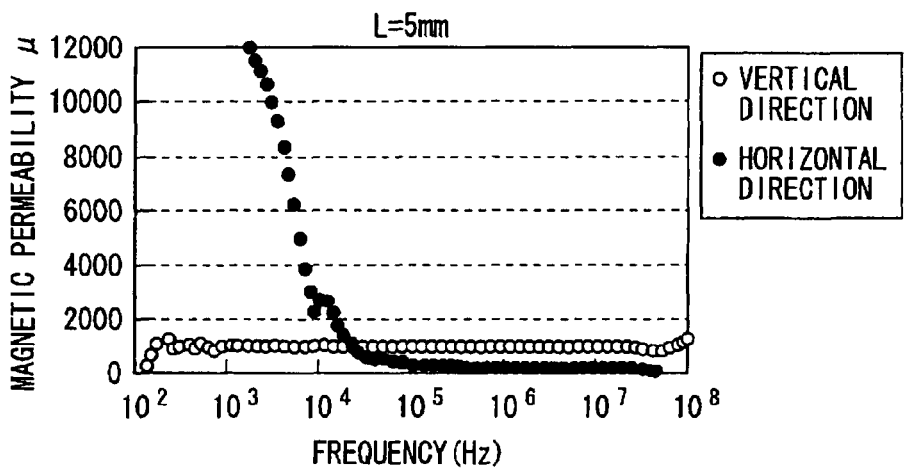
Figure 8C:
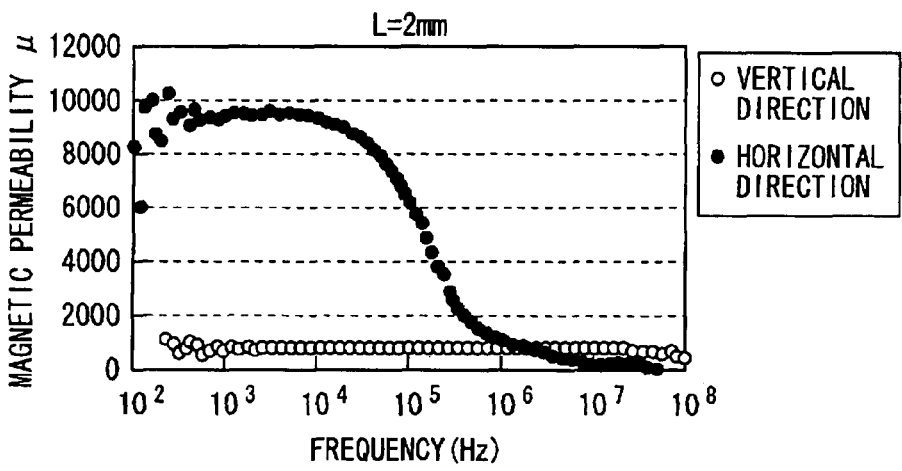
Figure 9A:
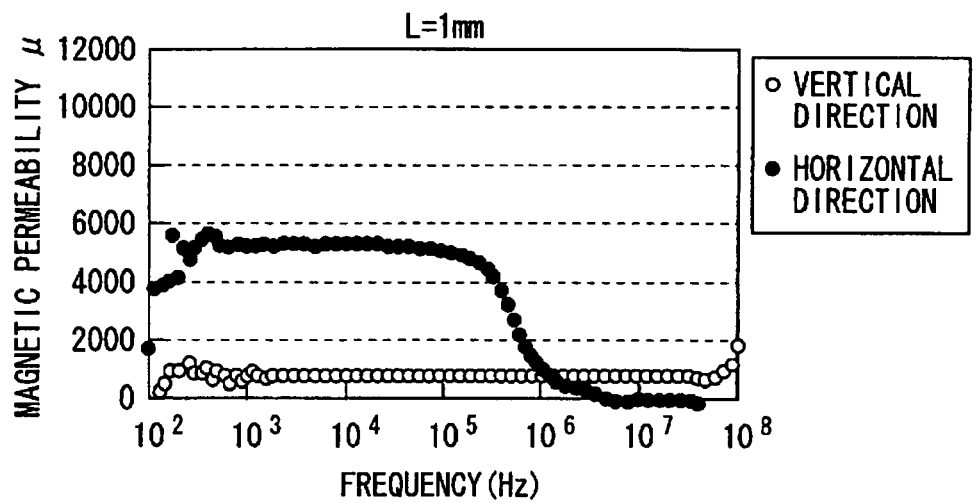
FIGS. 9A to 9C are characteristic diagrams showing an example of the frequency dependency of magnetic permeability in the thin film magnetic device illustrated in FIG. 1.
Figure 9B:
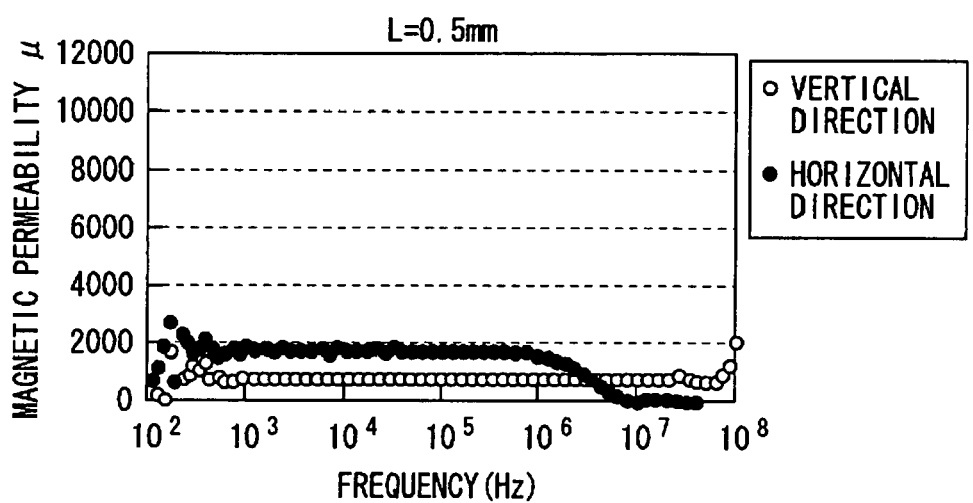
Figure 9C:
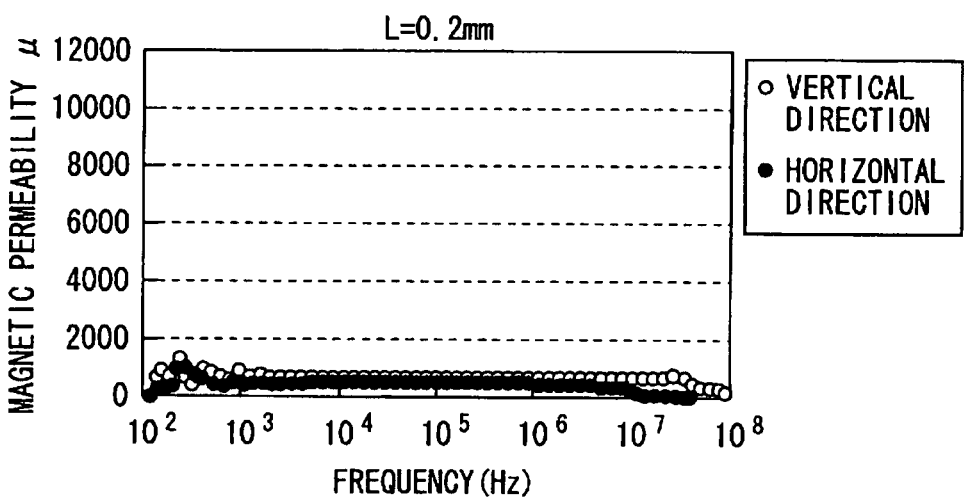
Figure 10A:
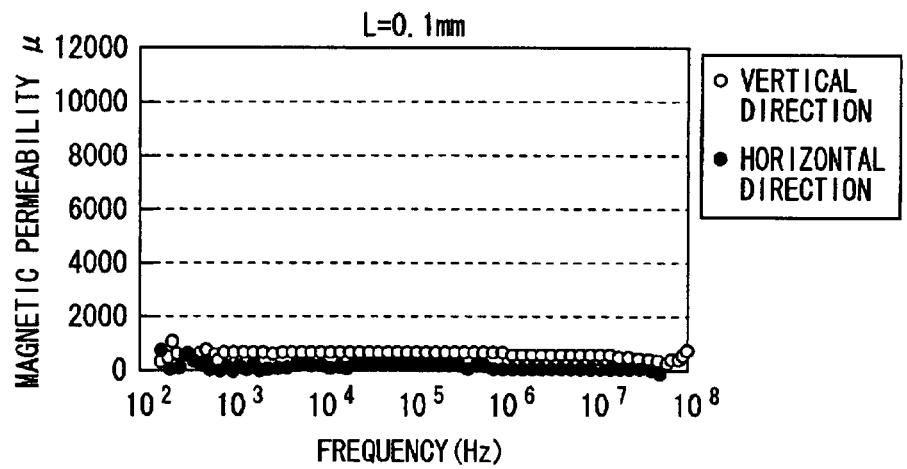
FIGS. 10A to 10C are characteristic diagrams showing an example of the frequency dependency of magnetic permeability in the thin film magnetic device illustrated in FIG. 1.
Figure 10B:
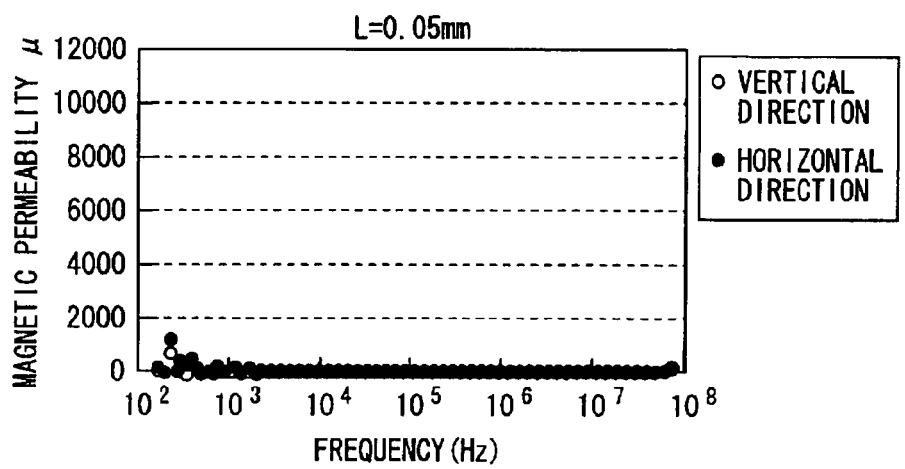
Figure 10C:
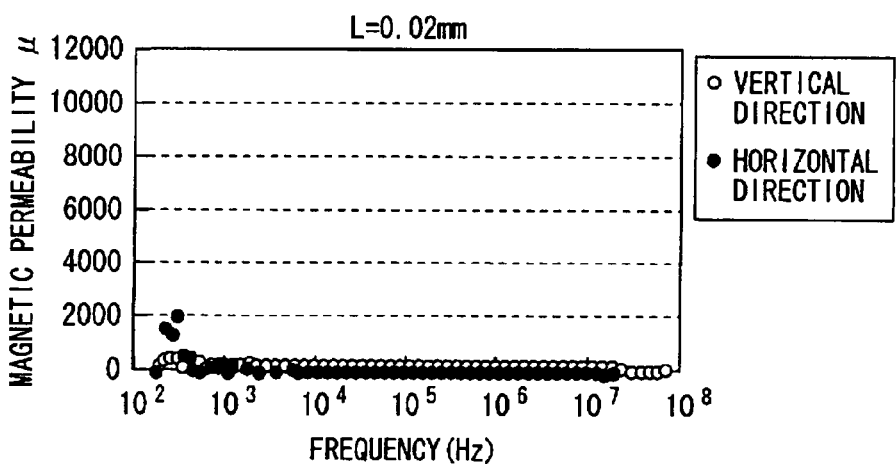

After that, for example, as shown in FIG. 7, it is preferable to perform heat treatment while applying a rotating magnetic field H2 in the plane (X-Y plane) of the magnetic film 14. Stress on the magnetic field 14 is relaxed and the magnetic anisotropy is lowered, so that the magnetic permeability μh in the magnetization hard axis Mh can be increased, and the inductance of the thin film inductor 1 can be increased. For example, the intensity of the rotating magnetic field H2 is about $300 \times 10^3/4\pi$ [A/m] (=300 Oe), the number of revolutions of the rotating magnetic field H2 is about 90 rpm, the heat treatment temperature is about 330° C., and heat treatment time is about one hour.

In the method of manufacturing the thin film inductor 1, the heat treatment is performed while applying the fixed magnetic field H1, the magnetization easy axis Me and the magnetization hard axis Mh are generated and, after that, the slits 16 are formed. Alternatively, after the slits 16 (and the opening 15) are formed, the heat treatment may be performed while applying the fixed magnetic field H1 as shown in FIG. 4 and the magnetization easy axis Me and the magnetization hard axis Mh may be generated. Concretely, the slits 16 are formed so as to be almost parallel with a part of the coil 13, that is, one of the first and second coil parts in the plane of the magnetic film 14, and heat treatment is performed while applying the fixed magnetic field H1 in the direction orthogonal to the slits 16 in the plane (X-Y plane) of the magnetic film 14. In such a manner as well, the thin film inductor 1 similar to the above-described thin film inductor 1 can be manufactured.

In the above-described method of manufacturing the thin film inductor 1, after formation of the magnetic film 14, the heat treatment is performed while applying the fixed magnetic field H1, and the magnetization easy axis Me and the magnetization hard axis Mh are generated. The magnetization easy axis Me and the magnetization hard axis Mh may be also generated by forming the magnetic field 14 while applying the fixed magnetic field H1 by using, for example, the DC magnetron sputtering. In such a manner as well, the thin film inductor 1 similar to the above can be manufactured.

Figure 11A:
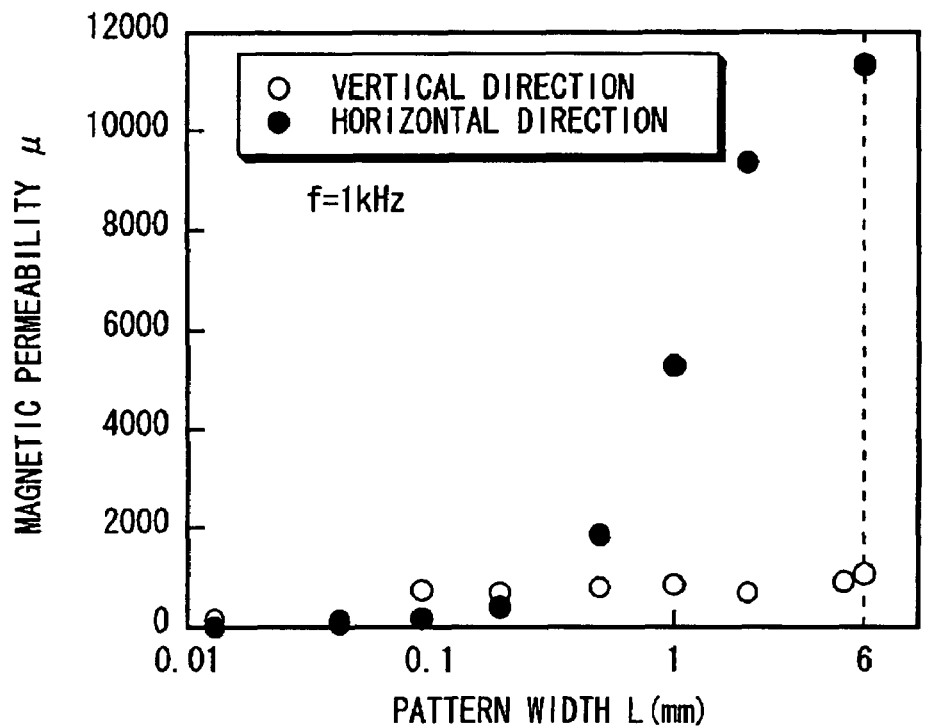
FIGS. 11A and 11B are characteristic diagrams showing an example of pattern width dependency of the magnetic permeability in the thin film magnetic device illustrated in FIG. 1.
Figure 11B:
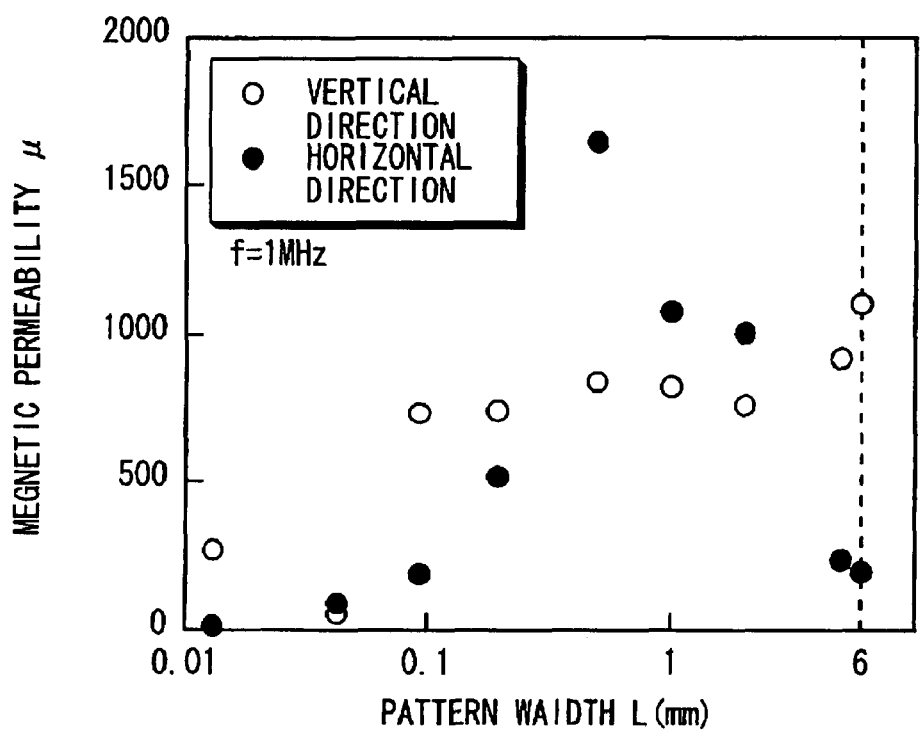
Figure 12A:
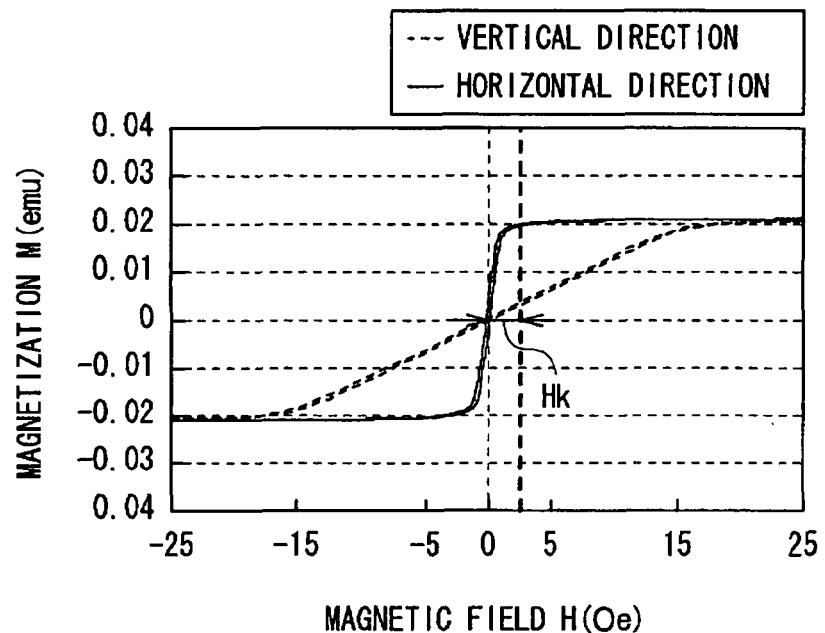
FIGS. 12A and 12B are characteristic diagrams showing an example of a magnetization curve in the thin film magnetic device illustrated in FIG. 1 together with a comparative example.
Figure 12B:
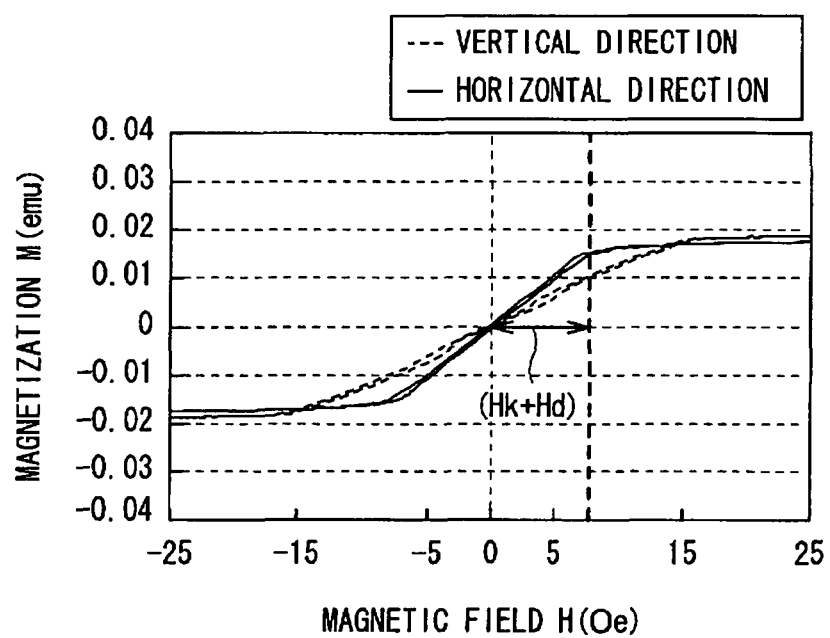
Figure 13:
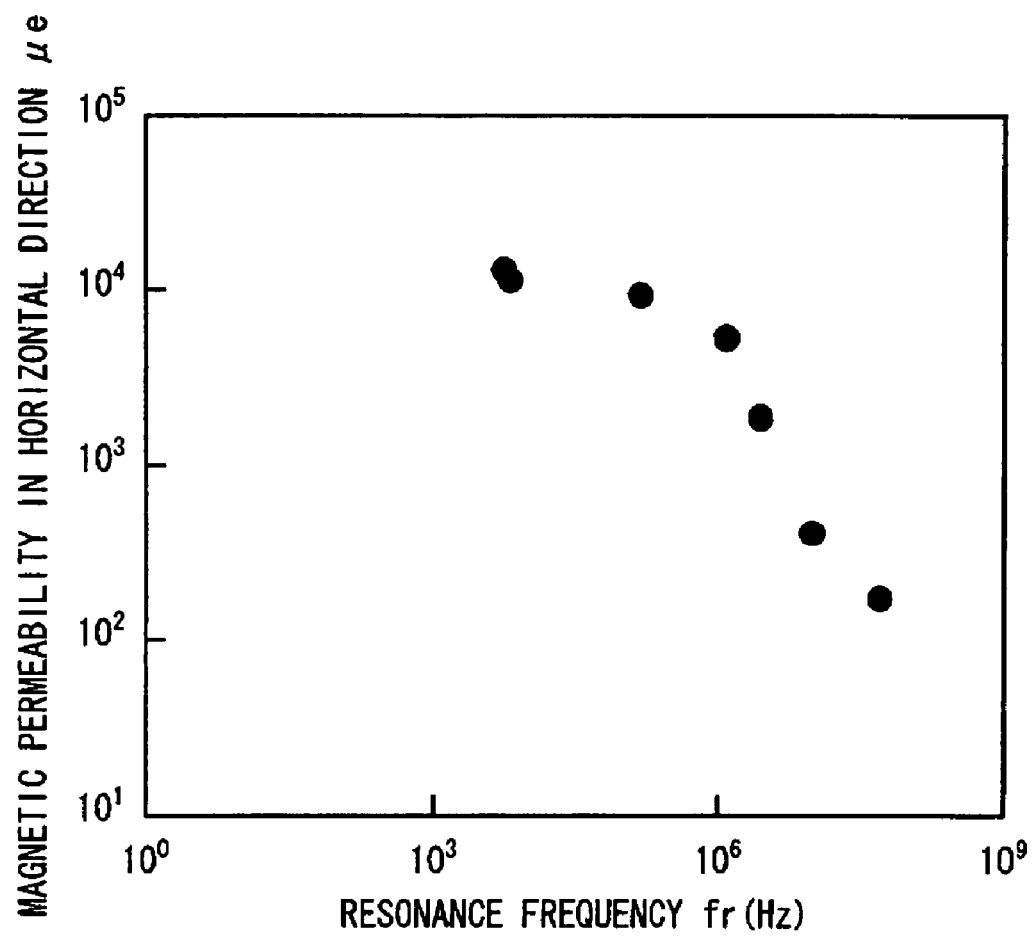
FIG. 13 is a characteristic diagram showing an example of the relation between magnetic permeability and resonance frequency in the thin film magnetic device illustrated in FIG. 1.
Figure 14:
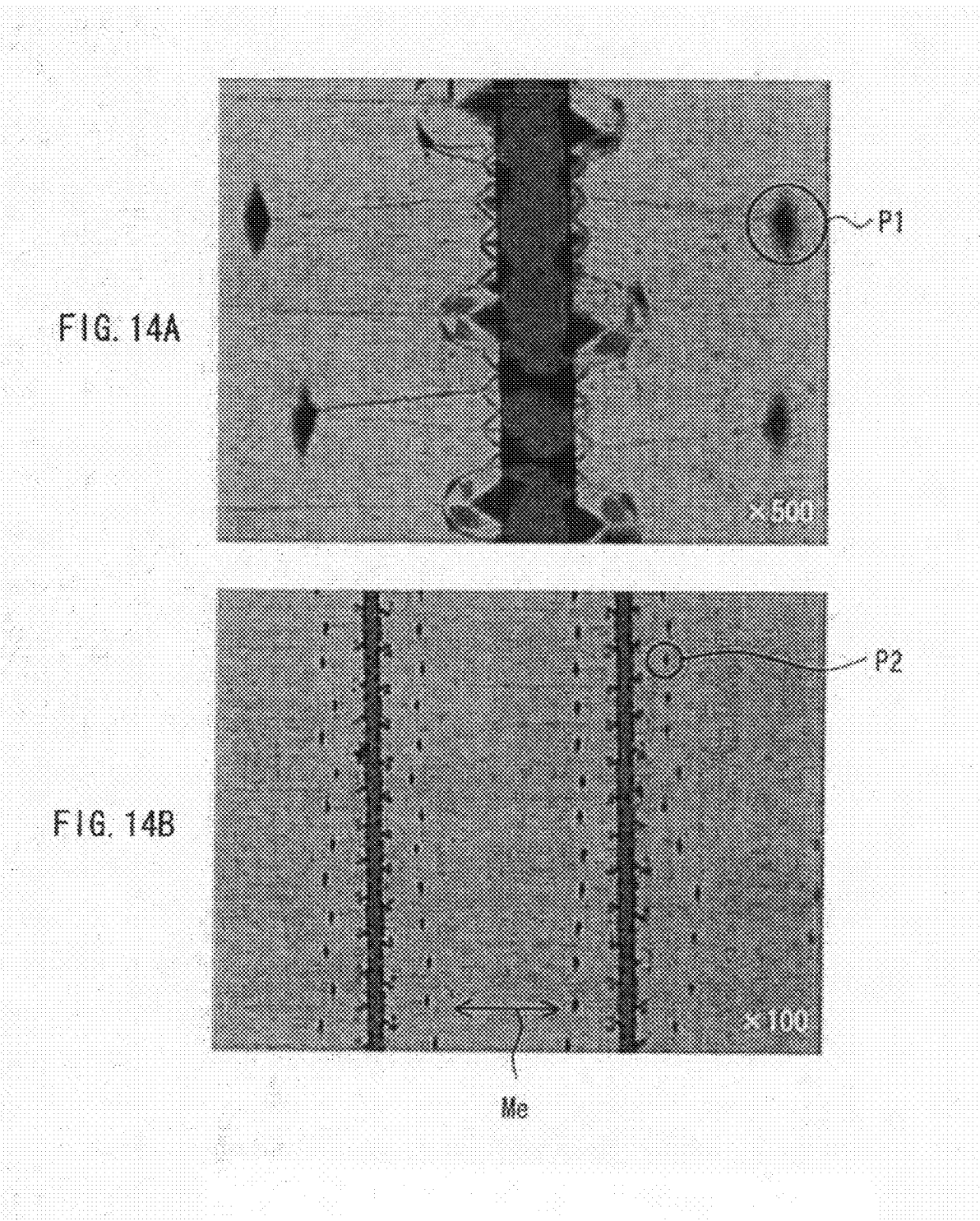
FIGS. 14A and 14B are enlarged micrographs showing an example of the surface of the magnetic film illustrated in FIG. 1.
Figure 15:
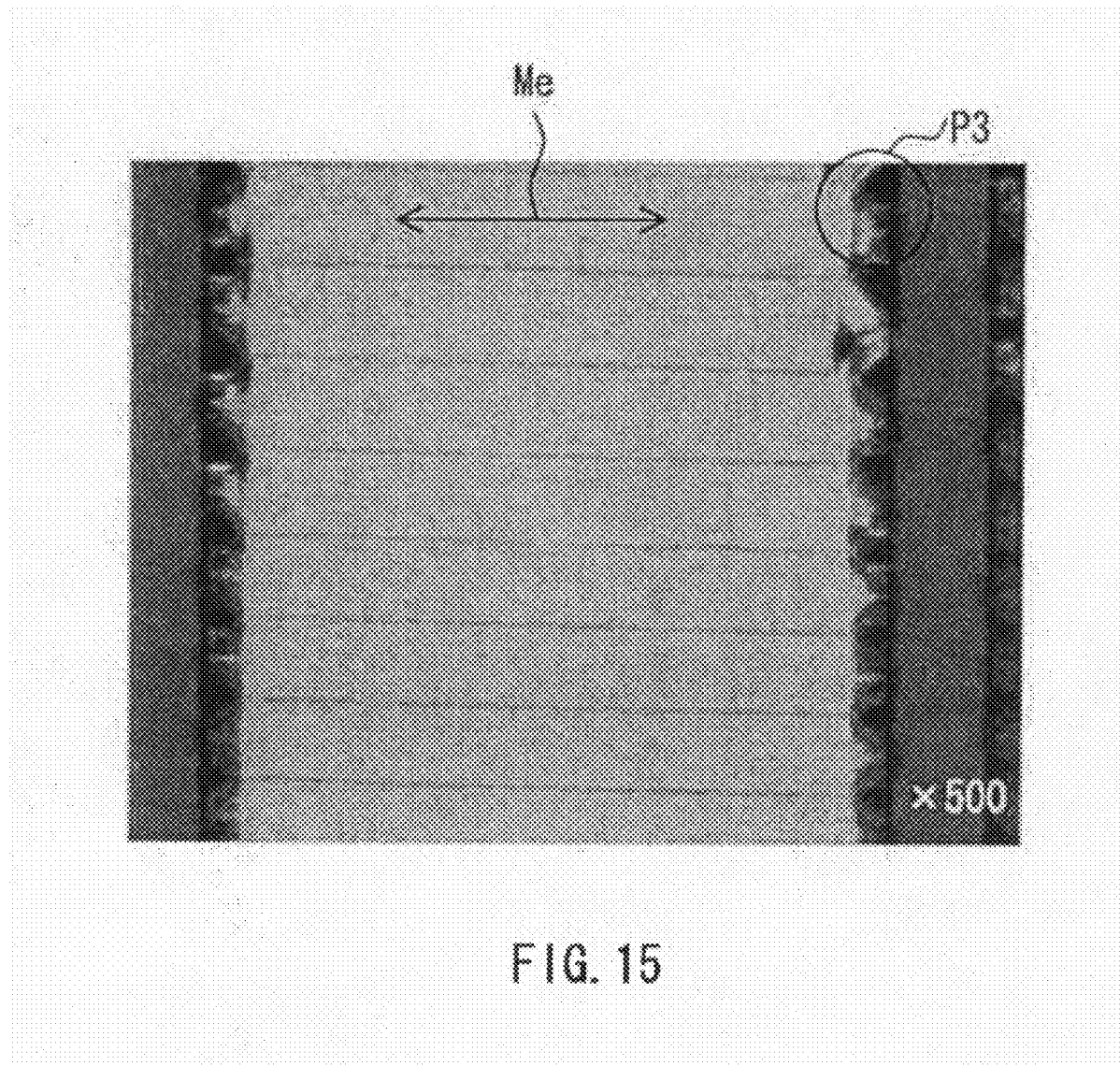
FIG. 15 is an enlarged micrograph showing an example of the surface of the magnetic film illustrated in FIG. 1.
Figure 16A:
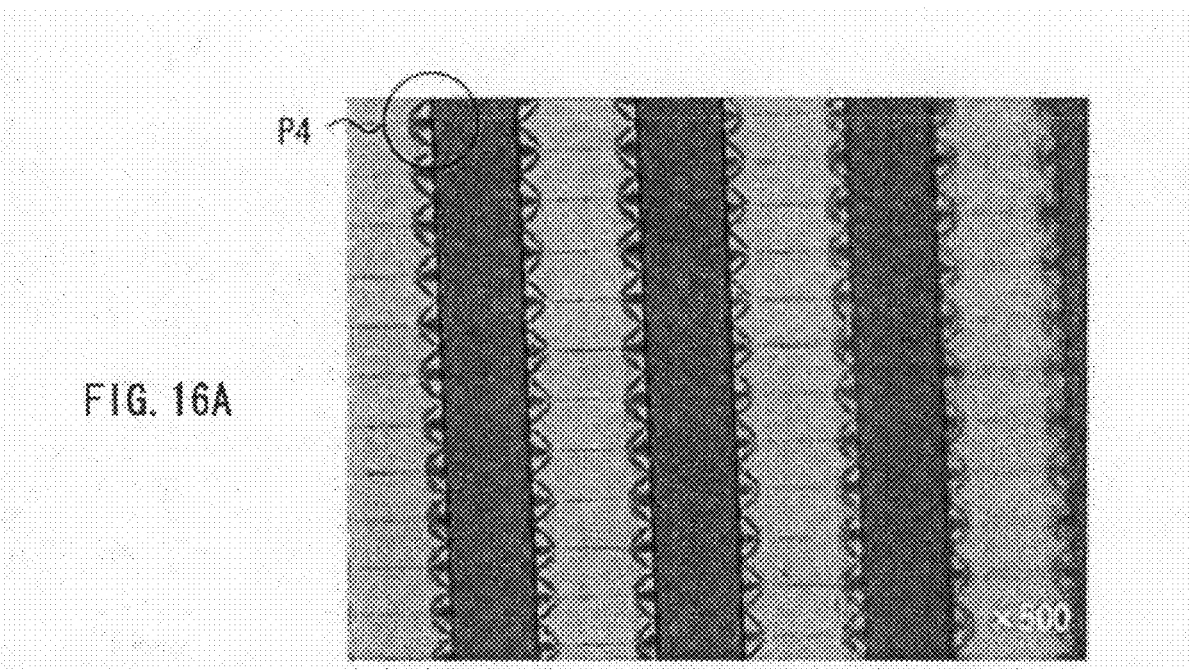
FIGS. 16A and 16B are enlarged micrographs showing an example of the surface of the magnetic film illustrated in FIG. 1.
Figure 16B:
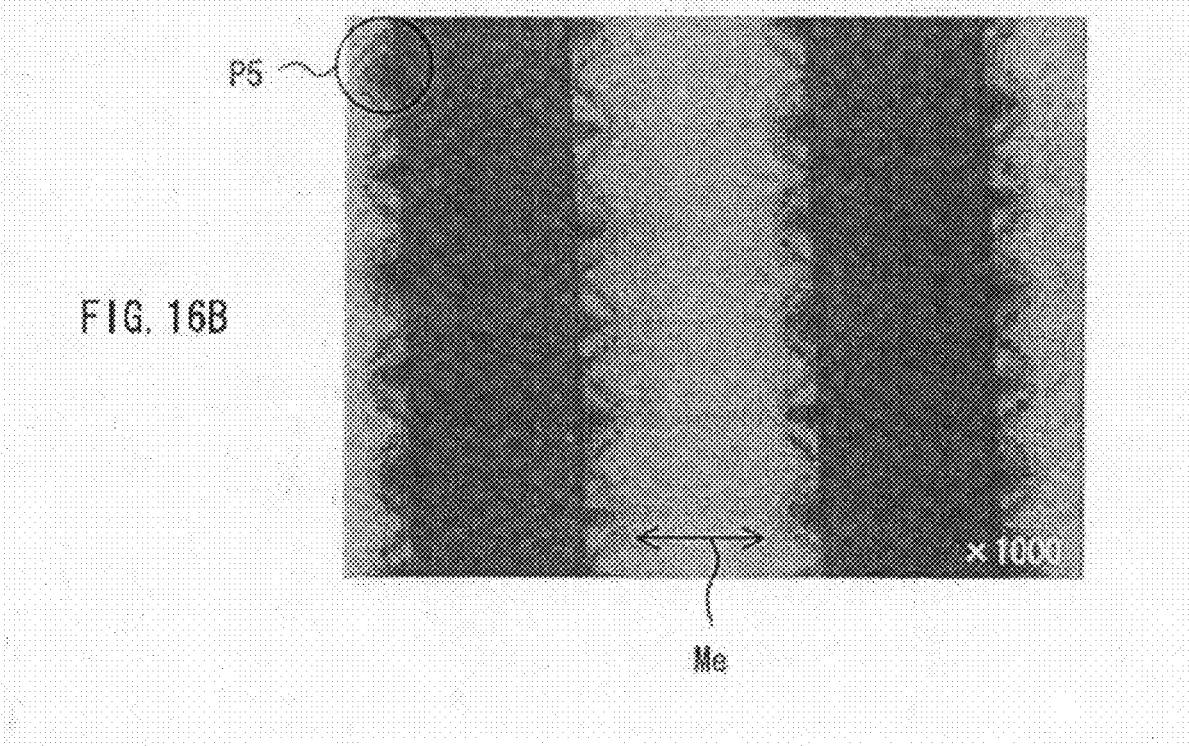
Figure 17A:
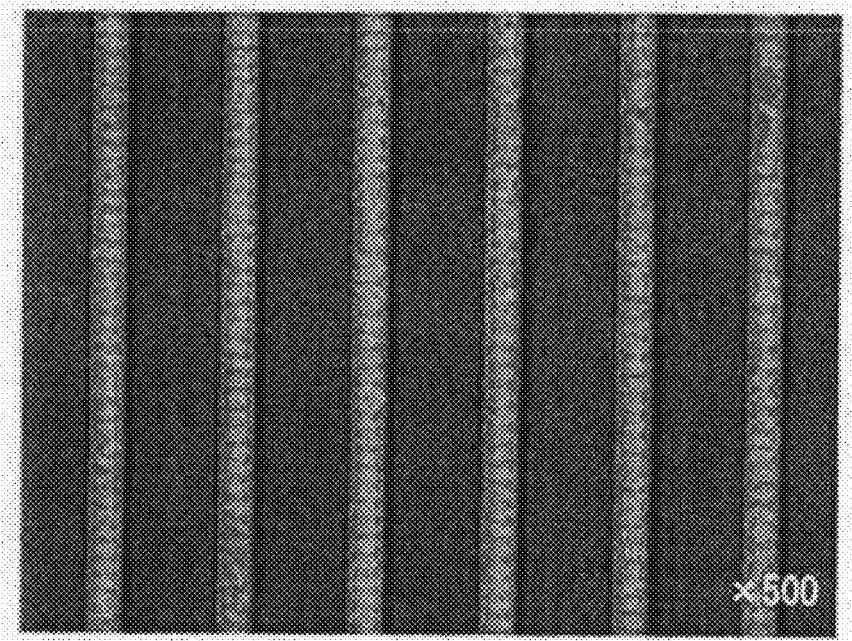
FIGS. 17A and 17B are enlarged micrographs showing an example of the surface of the magnetic film illustrated in FIG. 1.
Figure 17B:
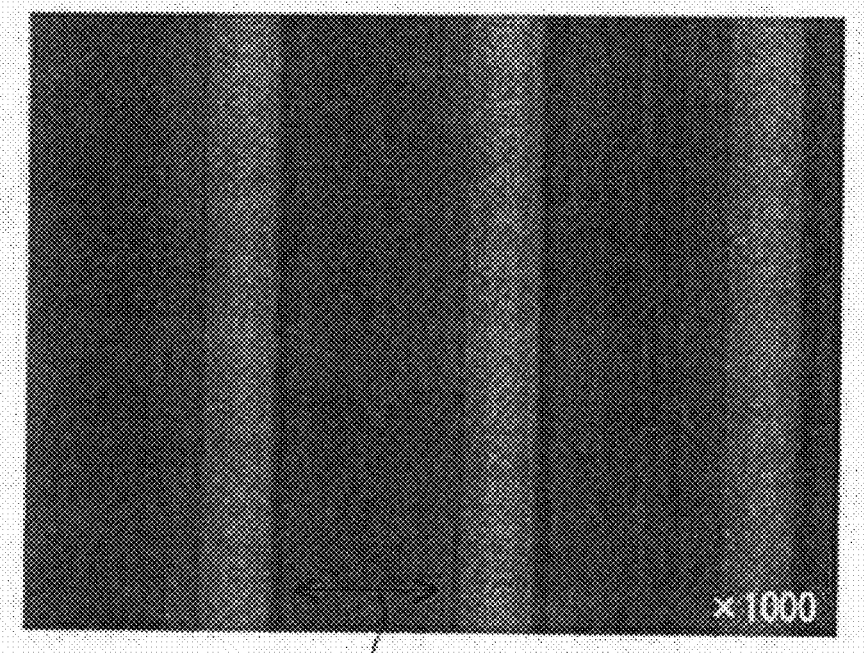
Figure 18:
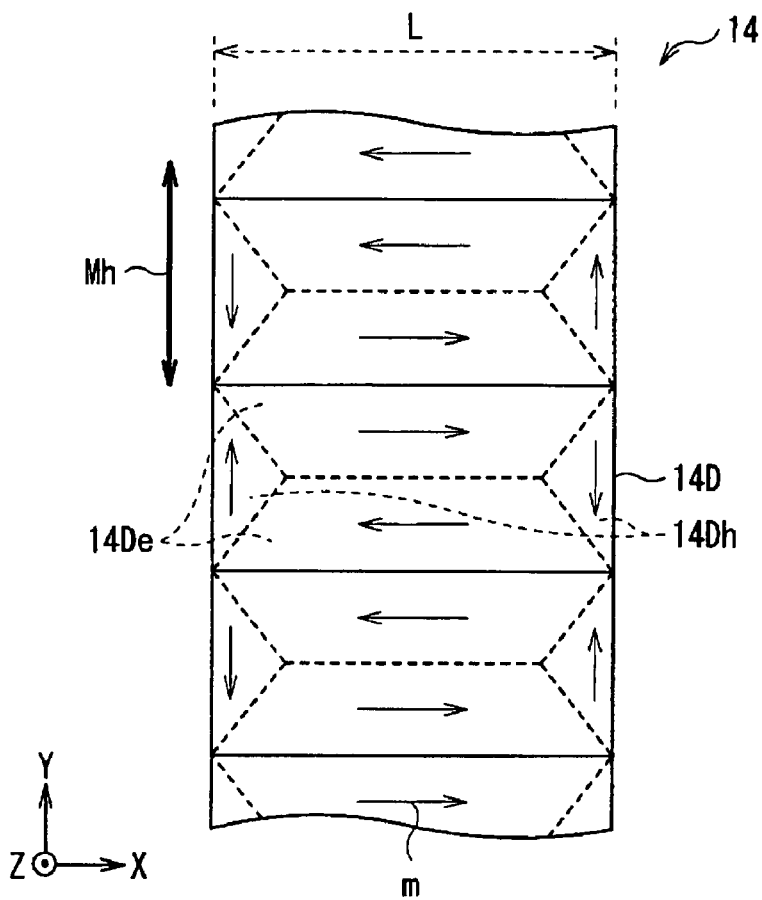
FIG. 18 is a schematic view showing the details of a magnetic domain structures in FIGS. 14A and 14B to FIGS. 17A and 17B.
Figure 19:
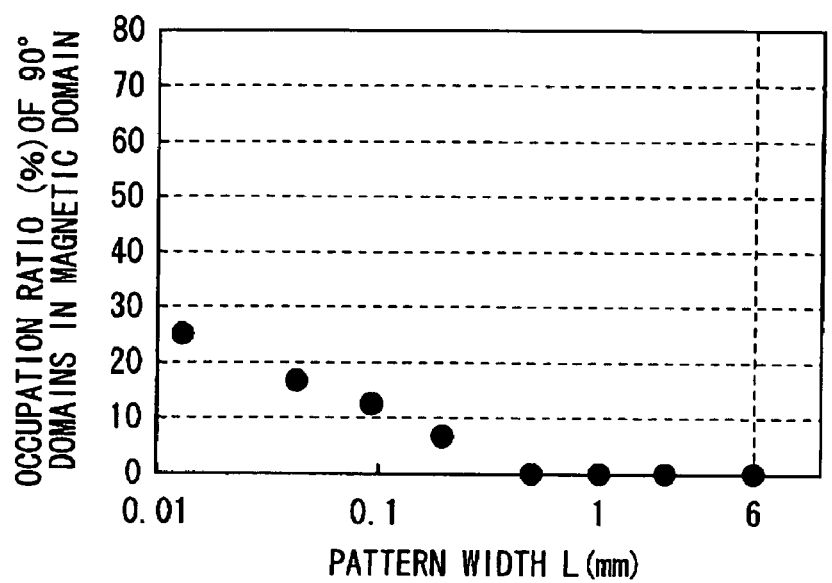
FIG. 19 is a characteristic diagram showing an example of the relation between 90° domain occupation ratio and the pattern width in the thin film magnetic device illustrated in FIG. 1.

Referring to FIGS. 8A to 8C to FIG. 19, the magnetic characteristics of the thin film inductor 1 will be described in detail. FIGS. 8A to 8C to FIGS. 10A to 10C show an example of the frequency dependence of the magnetic permeability μ in the case where the pattern width L is changed from 6 mm to 0.02 mm. FIGS. 11A and 11B show an example of the dependence on the pattern width L of the magnetic permeability μ. FIGS. 12A and 12B show an example of the magnetization curve (the relation between the application magnetic field H and magnetization M). FIG. 13 shows an example of the relation between the magnetic permeability μ and resonance frequency "fr". FIGS. 14A and 14B to FIGS. 17A and 17B are enlarged micrographs by the Bitter technique using magnetic colloids and show examples of the surface of the magnetic film 14 in the case where the pattern width L=0.5 mm, 0.2 mm, 0.05 mm, and 0.02 mm, respectively. FIG. 18 schematically shows the details of a magnetic domain structure in the micrographs. FIG. 19 shows an example of the relation between 90° domain occupation ratio which will be described later and the pattern width L. The case where the pattern width L=6 mm in each of the diagrams corresponds to the case of the conventional technique where no slits 16 are formed, and is shown as a comparative example.

The manufacturing parameters of the thin film inductor 1 in the examples are as follows. The magnetic film 14 is formed while applying the fixed magnetic field H1 by using the DC magnetron sputtering, and CoZrTa is used as the target. At the time of forming the slits 16, a positive resist for semiconductor is used to form the photoresist pattern 2. As the etching material (etchant), an etchant having iron chloride ($FeCl_3$): $H_2O$:hydrogen fluoride (HF)=1:2:0.2 is used. As the photoresist remover, acetone is used. An impedance analyzer is used for evaluating the thin film inductor 1 manufactured. The ferrite yoke method is used as the measuring method.

With respect to the frequency dependence of the magnetic permeability μ shown in FIGS. 8A to 8C to FIGS. 10A to 10C, the magnetic permeability μh in the direction (magnetization hard axis Mh direction) perpendicular to direction of applying the fixed magnetic field H1 hardly changes when the pattern width L=6 mm to 0.1 mm. On the other hand, the magnetic permeability μe in the horizontal direction (the direction of the magnetization easy axis Me) in the direction of applying the fixed magnetic field H1 decreases as the value of the pattern width L decreases (as the pattern width L of each of the slits 16 decreases, the slits 16 being formed in the state of the comparative example in which the slits 16 having the L=6 mm are not formed). The magnetic permeability μe maintains a certain level also in the high frequency area (in the case where L=0.2 mm, about $10^7$ Hz=about 10 MHz), and the resonance frequency fr also increases.

The relation between the magnetic permeability μ and the pattern width L is as shown in the following Table 1. FIGS. 11A and 11B are graphs formed based on the values shown in Table 1. FIG. 11A shows the case where the frequency "f" is 1 kHz. FIG. 11B shows the case where the frequency "f" is 1 MHz.

TABLE 1

| | MAGNETIC PERMEABILITY μ | | | |
|---|---|---|---|---|
| | f = 1 kHz | | f = 1 MHz | |
| PATTERN WIDTH L (mm) | VERTICAL DIRECTION | HORIZONTAL DIRECTION | VERTICAL DIRECTION | HORIZONTAL DIRECTION |
| 0.02 | 146 | 2 | 268 | 13 |
| 0.05 | 80 | 132 | 53 | 88 |
| 0.10 | 759 | 173 | 733 | 188 |
| 0.20 | 698 | 412 | 741 | 516 |
| 0.50 | 808 | 1869 | 839 | 1648 |
| 1.00 | 859 | 5291 | 824 | 1076 |
| 2.00 | 706 | 9360 | 761 | 1007 |
| 5.00 | 925 | 12987 | 921 | 237 |
| 6.00 (WITHOUT SLITS: COMPARATIVE EXAMPLE) | 1082 | 11336 | 1104 | 195 |

It is understood from Table 1 and FIGS. 11A and 11B that the magnetic permeability μh in the vertical direction hardly changes irrespective of the pattern width L in both of the cases where the frequency "f"=1 kHz and 1 MHz. The magnetic permeability μe in the horizontal direction decreases monotonously as the value of the pattern width L decreases in the case where the frequency "f"=1 kHz in a relatively low frequency area (FIG. 11A). On the other hand, in the case where the frequency "f" in the high frequency area is 1 MHz (FIG. 11B), the magnetic permeability μe increases as the value of the pattern width L decreases as in the comparative example (L=6 mm) and has the peak value at L=about 0.5 mm. Therefore, to increase the magnetic permeability μ in the high frequency area, it is desirable to form the slits 16 and, as understood from FIG. 11B, set the pattern width L between neighboring slits to a range from about 0.1 mm to 0.5 mm. To further increase the magnetic permeability μ, preferably, the pattern width L lies in the range from 0.3 mm to 2 mm and, more preferably, in the range from 0.3 mm to 1 mm.

The relation between the formation of the slits 16 and increase in the magnetic permeability μ in the high frequency area is considered as follows with reference to FIGS. 12A and 12B. FIG. 12A shows the magnetization curve in the comparative example (L=6 mm) where no slits 16 are formed. FIG. 12B shows the magnetization curve in the case (L=0.5 mm) where the slits 16 are formed.

It is known that the following equations (1) and (2) are satisfied between anisotropic magnetic field Hk and the magnetic permeability μ or resonance frequency "fr" in the magnetization hard axis Mh direction of the magnetic film. It is expected that the equations (1) and (2) are similarly satisfied also in the magnetization easy axis Me direction. In the equations, Bs denotes saturation magnetic flux, Ms denotes saturation magnetization, μ0 denotes magnetic permeability in vacuum, and γ indicates gyromagnetic ratio.

$$\mu = \frac{Bs}{Hk} \qquad \text{Equation (1)}$$

$$f_r = \frac{\gamma}{2\pi}\sqrt{\frac{M_s H_k}{\mu_0}} \qquad \text{Equation (2)}$$

When attention is paid to the magnetization easy axis Me direction, the gradient of the magnetization curve shown in FIG. 12B is milder than that of the magnetization curve in the comparison example shown in FIG. 12A due to the influence of a demagnetizing field Hd, and the value of the anisotropic magnetic field Hk increases (Hk increases to (Hk+Hd)). Therefore, it is understood from the equations (1) and (2), although the value of the magnetic permeability p itself decreases, the resonance frequency "fr" increases. Consequently, the magnetic permeability μ can be maintained to some extent also in the high frequency area. Since the value of the anisotropic magnetic field Hk increases due to the influence of the demagnetizing field Hd as described above, the magnetic permeability μe in the horizontal direction in the high frequency area increases, and the magnetic permeability μ increases as a whole.

Table 2 shows the relation between the resonance frequency fr and the magnetic permeability μe in the horizontal direction in the case where the pattern width L is changed from 6 mm to 0.02 mm. FIG. 13 is a graph formed on the basis of the values shown in Table 2.

TABLE 2

| PATTERN WIDTH L (mm) | RESONANCE FREQUENCY Fr (Hz) | MAGNETIC PERMEABILITY IN HORIZONTAL DIRECTION μe (1 kHz) |
|---|---|---|
| 0.02 | — | 2 |
| 0.05 | — | 132 |
| 0.10 | $5.01 \times 10^7$ | 173 |
| 0.20 | $9.55 \times 10^6$ | 412 |
| 0.50 | $2.75 \times 10^6$ | 1869 |
| 1.00 | $1.20 \times 10^6$ | 5291 |
| 2.00 | $1.51 \times 10^5$ | 9360 |
| 5.00 | $5.50 \times 10^3$ | 12987 |
| 6.00 (WITHOUT SLITS: COMPARATIVE EXAMPLE) | $6.31 \times 10^3$ | 11336 |

It is understood also from Table 2 and FIG. 13 that when the slits 16 are formed and the value of the pattern width L decreases, the magnetic permeability μe itself in the horizontal direction decreases but the resonance frequency "fr" increases.

Next, it is understood from the micrographs of the magnetic film 14 shown in FIGS. 14A and 14B to FIGS. 17A and 17B that a plurality of magnetic domains magnetized in the width direction (X axis direction) of the slits 16 are lined up in the longitudinal direction (Y magnetic domain direction) of the strip-shaped area sandwiched by the neighboring slits 16 in the magnetic film 14. It is also understood that even if the pattern width L is narrowed from FIGS. 14A and 14B to FIGS. 17A and 17B, the horizontally-oriented magnetic domain structures in the width direction (X axis direction) of the strip-shaped area remains horizontally oriented, and a phenomenon such as rotation of the magnetization easy axis Me by 90° does not occur. However, as the pattern width L decreases, the aspect ratio of the magnetic domain (the ratio of the length in the minor axis direction to the length in the major-axis direction of the magnetic domain) changes to gradually become a square shape (the aspect ratio increases). The aspect ratio of each of the magnetic domains is preferably 0.3 or less in consideration of the 90° domain occupation ratio which will be described later. It is because the magnetic permeability μ can maintain also at the high frequency side due to the influence of the demagnetizing field Hd.

Further, spike structures indicated by marks P1 and P2 in FIGS. 14A and 14B (case of L=0.5 mm) disappear in FIGS. 15A and 15B to FIGS. 17A and 17B (case of L=0.2, 0.05, and 0.02 mm). Instead, a plurality pairs of triangle magnetic domains (90° domains) indicated by marks P3 to P5 are lined up in the longitudinal direction (Y axis direction), each of the pairs of magnetic domains being disposed at both ends in the width direction (X axis direction) of the strip-shaped area. Each of the triangle magnetic domains has the magnetization direction in the longitudinal direction (Y axis direction) of the strip-shaped area.

FIG. 18 schematically shows the magnetic domain structures and corresponds to the strip-shaped area (the magnetic film 14 having the pattern width L) existing between the slits 16. As described above, a plurality pairs of magnetic domains 14D are formed and lined up in the longitudinal direction (the Y axis direction and the magnetization hard axis Mh direction). Each of the magnetic domains 14D is made by a pair of magnetic domains 14De whose magnetization direction matches to the width direction (the X magnetic domain direction and the magnetization easy axis Me direction) and a pair of magnetic domains (90° domains) 14Dh whose magnetization direction matches the longitudinal direction and positioned at both ends of the magnetic domain 14De. The magnetization directions of the magnetic domains 14De and 14Dh form a closed loop. The directions of the closed loops in the neighboring magnetic domains 14D are opposite to each other.

It is understood as follows from the relation between the pattern width L and the occupation ratio of the 90° domains in the magnetic domain 14. When the pattern width L is 0.5 mm or larger, the 90° domain occupation ratio is almost 0%, and domains hardly exist in the magnetic domain 14. When the pattern width L is less than 0.5 mm, the 90° domain occupation ratio increases monotonously. As shown in FIG. 11B, the magnetic permeability μe in the horizontal direction (the direction of the magnetization easy axis Me) has the peak value at around 0.5 mm of the pattern width L. Consequently, when the 90° domain occupation ratio increases, the magnetic permeability μe in the horizontal direction which tends to increase as the pattern width L decreases tends to decrease. As a result, to effectively improve the magnetic permeability μ in the high frequency area, the 90° domain occupation ratio is desirably 12% or less.

As described above, in the embodiment, the slits 16 extending in one direction (X axis direction) in the plane of the magnetic film 14B are formed, and each of the slits 16 is formed only in a pair of areas facing each other (in this case, two areas positioned on the upper and lower sides of the opening 15), the pair of areas being selected from four areas obtained by dividing the extension area of the coil 13 in the winding direction (four areas positioned on the upper and lower sides and the right and left sides of the opening 15); Consequently, while reducing the stress in the magnetic film 14B, drop in the magnetic permeability μ due to the influence of the demagnetizing field Hd is suppressed, and the magnetic permeability can be maintained.

In the strip-shaped area sandwiched by the plurality of slits 16 in the magnetic film 14, the magnetic domains 14Dh (90° domains) are lined up in the longitudinal direction (Y axis direction) of the strip-shaped area, each of the pairs of magnetic domains being disposed at both ends in the width direction (X axis direction) of the strip-shaped area so as to face each other. Consequently, the action of increasing the resonance frequency "fr" due to the demagnetizing field Hd in the magnetic domain 14De sandwiched by the pair of magnetic domains 14Dh can be effectively promoted. Thus, the magnetic permeability in the high frequency area can be more effectively improved.

In the strip-shaped area, the magnetic domains 14De whose longitudinal direction matches the width direction of the strip-shaped area (the X magnetic domain direction and the magnetization easy axis Me direction) are lined up in the longitudinal direction (Y axis direction) of the strip-shaped area. Therefore, in both of the case where the magnetization easy axis Me and the coil 13 are parallel with each other and are almost orthogonal to each other, the magnetic permeability can be maintained to some extent in the high frequency area. Thus, the magnetic permeability in the high frequency area can be more effectively improved.

In particular, in the embodiment, the slits 16 are formed only in the area in which the magnetization easy axis Me of the magnetic film 14 and the coil 13 are almost orthogonal to each other and the slits 16 extend in the direction (magnetization hard axis Mh direction) orthogonal to the magnetization easy axis Me. Consequently, the magnetic permeability at high frequencies in the area where the magnetization easy axis Me and the coil 13 are almost orthogonal to each other (the area corresponding to the second coil parts in which the slits 16 extend) can be selectively increased. Therefore, the magnetic permeability in the high frequency area can be maintained to some extent not only in the area where the magnetization easy axis Me and the coil 13 are almost parallel with each other (the area corresponding to the first coil parts) but also the area where the magnetization easy axis Me and the coil 13 are almost orthogonal to each other. The magnetic permeability in the high frequency area can be improved more effectively.

Since the strip-shaped area is formed so as to overlap the second coil parts in the coil 13, the distance between the magnetic film 14 and the second coil part in the strip-shaped area is shortened, and the magnetic permeability can be further improved.

Further, in the method of manufacturing the thin film inductor 1 as the thin film magnetic device of the embodiment, the manufacturing process is not complicated. Consequently, the thin film magnetic device having high magnetic permeability in the high frequency area can be easily obtained.

Figure 20:
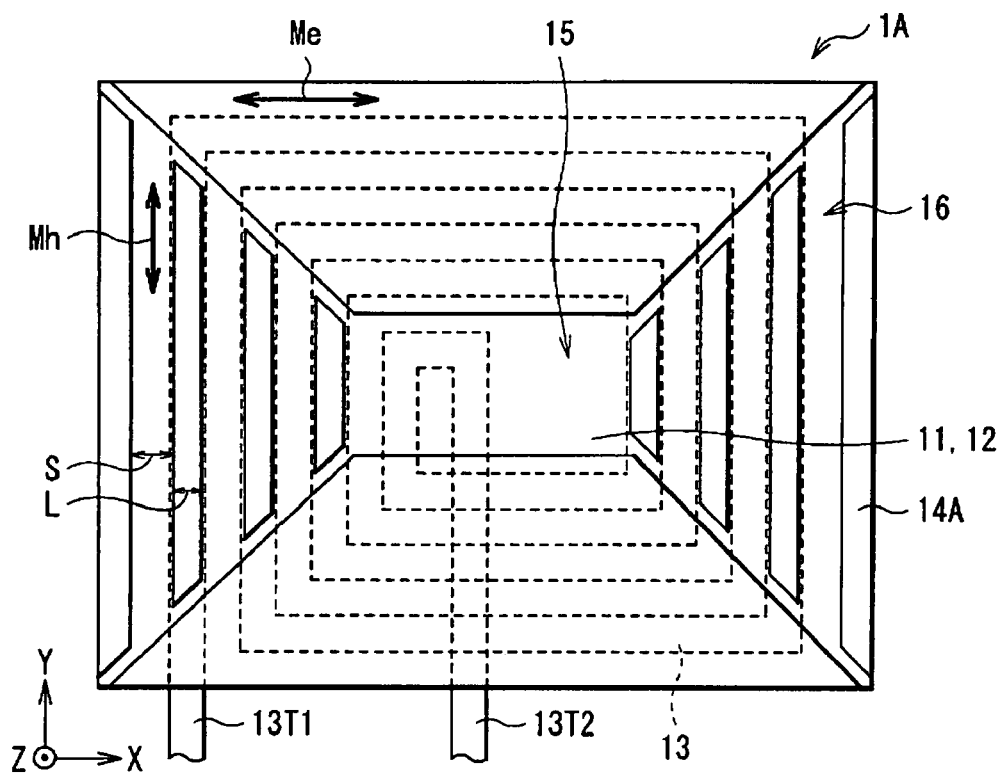
FIG. 20 is a plan view showing the configuration of a thin film magnetic device according to a modification of the first embodiment.

In the embodiment, the case where the slits 16 are formed only in the area where the magnetization easy axis Me and the coil 16 are almost orthogonal to each other has been described. The slits 16 may be formed in other areas. For example, in a thin film inductor 1A shown in FIG. 20, the slits 16 may be formed on diagonal lines extending from the opening 15 in a magnetic film 14A. In other words, a plurality of strip-shaped magnetic films 14A may be formed in one direction in the plane (in this case, the magnetization easy axis Me direction and the X axis direction). With such a configuration as well, effects similar to those of the first embodiment can be obtained.

Second Embodiment

A second embodiment of the present invention will be described.

Figure 21:
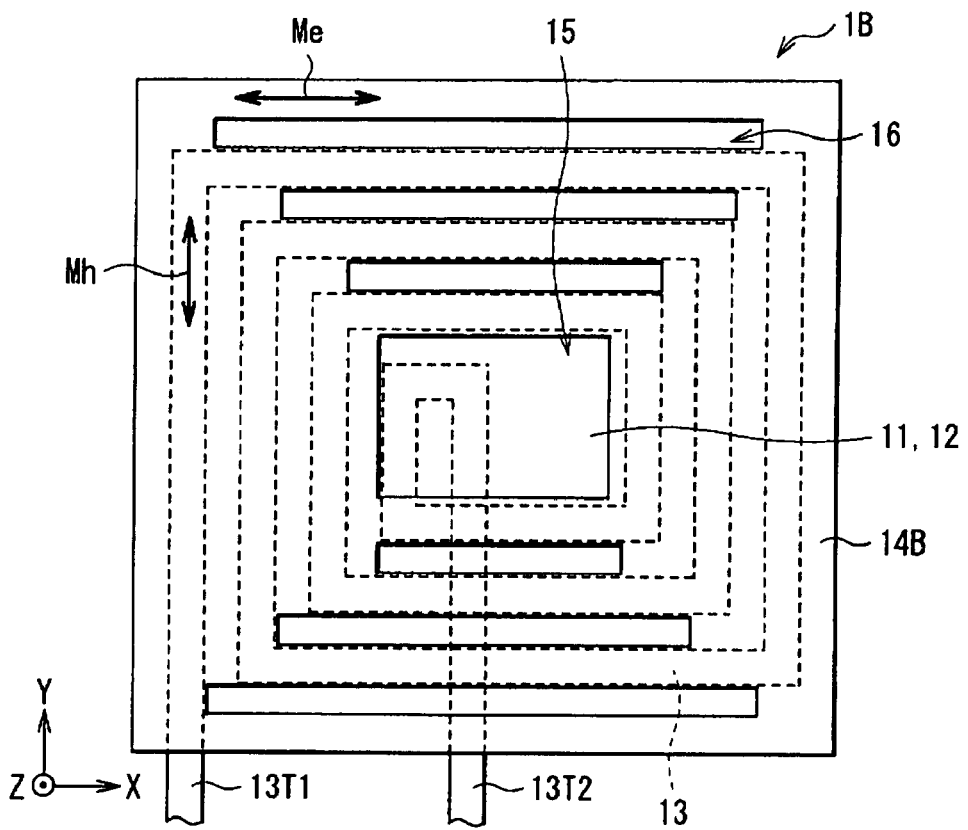
FIG. 21 is a plan view showing the configuration of a thin film magnetic device according to a second embodiment of the invention.

FIG. 21 shows the configuration (in an X-Y plane) of a thin film inductor 1B as a thin film magnetic device according to the second embodiment. In the diagram, the same reference numerals are designated to the same components as those of the thin film inductor 1 (FIG. 1) of the first embodiment, and their description will not be repeated.

In the thin film inductor of the second embodiment, the plurality of slits 16 are formed so as to extend in a predetermined direction in the plane of a magnetic film 14B (in FIG. 21, in areas where the magnetization easy axis Me and the coil 13 are almost parallel with each other). Specifically, in the thin film inductor 1 of the first embodiment shown in FIG. 1, the slits 16 are formed in the area where the magnetization easy axis Me of the magnetic film 14 and the coil 14 are almost orthogonal to each other. In contrast, in the thin film inductor of the second embodiment, the plurality of slits 16 extending in a predetermined direction in the plane are formed without limiting the formation area to the area where the magnetization easy axis Me and the coil 13 are almost orthogonal to each other.

Concretely, in the thin film inductor 1B shown in FIG. 21, the plurality of slits 16 extending in one direction (X axis direction) are formed only in a pair of areas (two areas positioned on the upper and lower sides of the opening 15), the pair of areas being selected from four areas (four areas positioned on the upper and lower sides and the right and left sides of the opening 15) obtained by dividing, along the winding direction, the area where the coil 13 extends. Each of the plurality of slits 16 is formed in the area between neighboring coil parts of the coil 13 (in FIG. 21, the areas between the first coil parts). The other configuration of the thin film inductor 1B and the method of manufacturing the thin film inductor 1B are basically similar to those of the thin film inductor 1.

With such a configuration, the thin film inductor 1B produces the stress reducing effect and the demagnetizing field suppressing effect in the magnetic film 14B.

FIGS. 22A and 22B show configurations in the Y-Z plane for explaining the stress reducing effect produced by the thin film inductor 1B. FIG. 22A shows a sectional configuration of the conventional thin film inductor 101 in which no slits are formed in the magnetic film as a comparative example. FIG. 22B shows a sectional configuration of the thin film inductor 1B of the second embodiment.

In the comparative example (the thin film inductor 101) shown in FIG. 22A, slits are not formed in the magnetic film 114, so that stress F101 likely to occur in various directions in the magnetic film 114. Therefore, as shown in the diagram, the thin film inductor 101 itself easily deflects in the stack direction (Z axis direction). Since the stress F101 increases, magnetostriction constant of the magnetic film 114 increases and the magnetic permeability μ of the magnetic film 114 decreases. Therefore, it is difficult to maintain the magnetic permeability μ to certain extent in the high frequency area.

In contrast, in the thin film inductor 1B of the second embodiment shown in FIG. 22B, the slits 16 are formed in one direction (X axis direction) in the plane of the magnetic film 14B. Consequently, addition of the stress F1 in the width direction (Y axis direction) of the slits 16 is avoided, and the stress in the magnetic film 14B decreases. Therefore, the deflection amount of the magnetic film 14B also decreases and the magnetic permeability μ of the magnetic film 14B improves as compared with the magnetic film 114 as a comparative example. In such a manner, in the thin film inductor 1B, it is easier to maintain the certain degree of the magnetic permeability μ in the high frequency area.

In the thin film inductor 1B, the slits 16 are formed only in a pair of areas facing each other (in this case, two areas positioned on the upper and lower sides of the opening 15), the pair of areas being selected from four areas obtained by dividing, in the winding direction (four areas positioned on the upper and lower sides and the right and left sides of the opening 15), the area where the coil 13 extends. Consequently, as compared with the case where the slits 16 are formed in the whole magnetic film, that is, in all of the four areas, drop in the magnetic permeability μ due to the influence of the demagnetizing field Hd is suppressed. Therefore, in the thin film inductor 1B, it is easier to maintain the magnetic permeability.

As described above, in the embodiment, the slits 16 extending in one direction (X axis direction) in the plane of the magnetic film 14B are formed, and the slits 16 are formed only in a pair of areas (two areas positioned on the upper and lower sides of the opening 15), the pair of areas being selected from four areas (four areas positioned on the upper and lower sides and the right and left sides of the opening 15) obtained by dividing, along the winding direction, the area where the coil 13 extends. Thus, while reducing the stress in the magnetic film 14B, drop in the magnetic permeability μ due to the influence of the demagnetizing field Hd is suppressed, and the magnetic permeability can be maintained.

Since each of the slits 16 is formed in the area between the first coil parts in the coil 13, in a manner similar to the first embodiment, the distance between the magnetic film 14B and the first coil part in the strip-shaped area is shortened, and the magnetic permeability can be further improved.

In the second embodiment, the case where the slits 16 are formed in the area where the magnetization easy axis Me and the coil 13 are almost parallel with each other as shown in FIG. 21 has been described. It is sufficient to form the plurality of slits 16 in the magnetic film 14B. The positions for forming the slits 16 are not limited to the case.

In addition to the slits 16 shown in FIG. 21, the slits 16 may be formed in other areas. For example, the slits 16 may be formed on diagonal lines extending from the opening 15 in the magnetic film 14B like in the thin film inductor 1A shown in FIG. 20. In other words, a plurality of strip-shaped magnetic films may be formed in one direction in the plane (in the case FIG. 21, the magnetization hard axis Mh direction and the Y axis direction). With such a configuration as well, effects similar to those of the embodiment can be obtained.

Although the present invention has been described above by the first and second embodiments, the invention is not limited to the embodiments but can be variously modified.

Figure 23A:
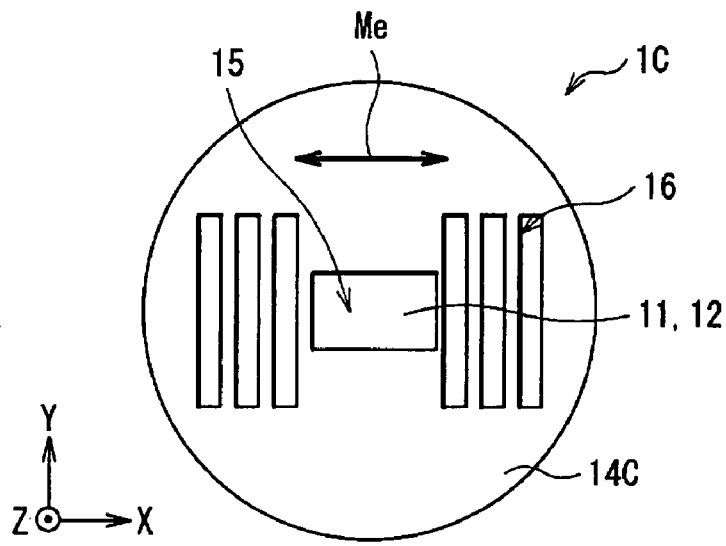
FIGS. 23A to 23C are plan views showing the configuration of the thin film magnetic device according to the modification of the invention.
Figure 23B:
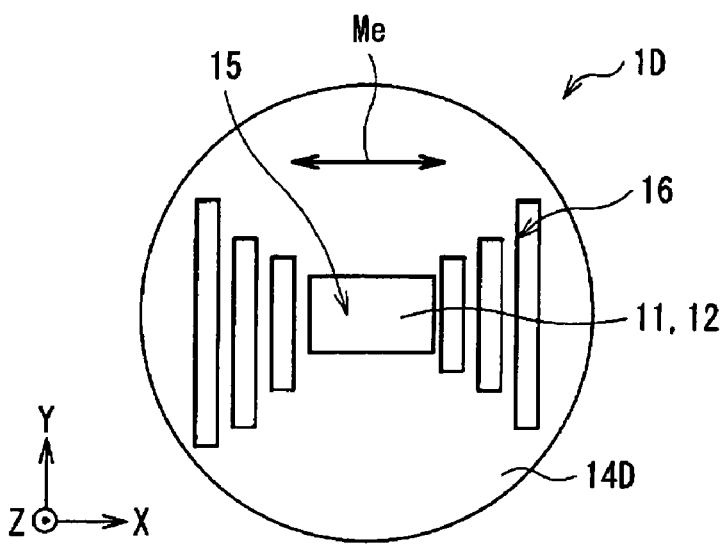
Figure 23C:
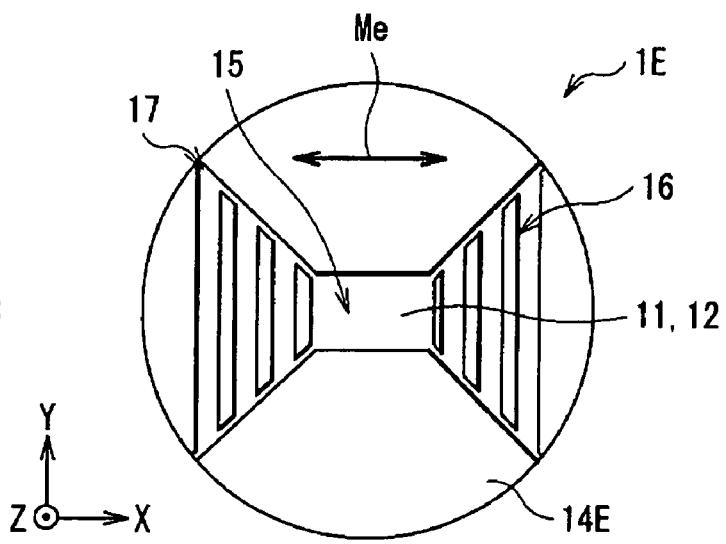
Figure 24:
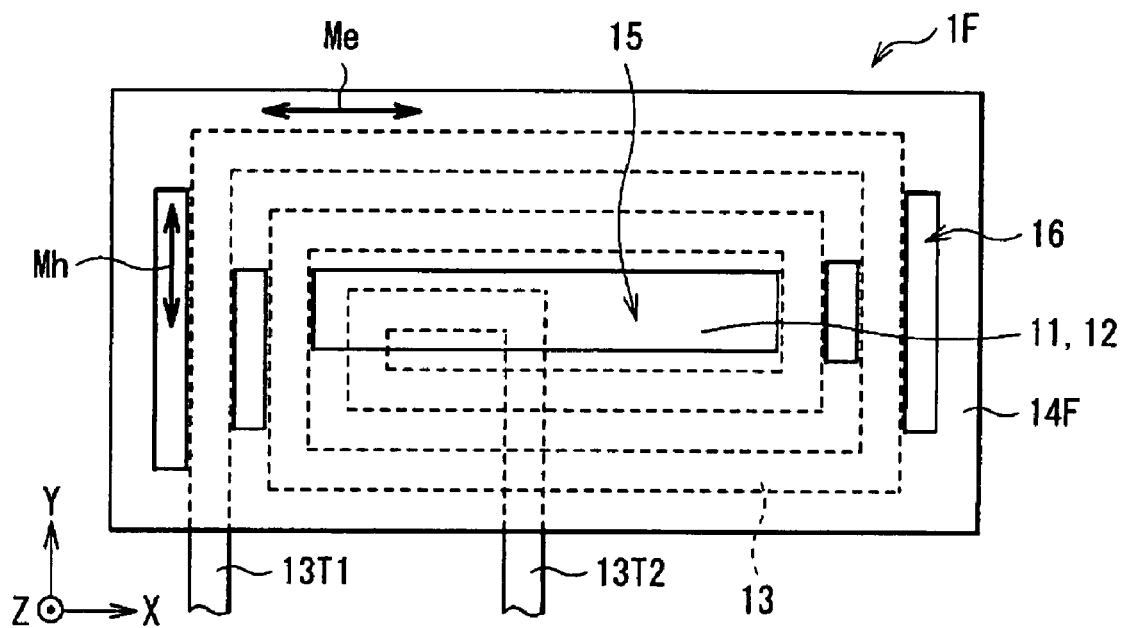
FIG. 24 is a plan view showing the configuration of the thin film magnetic device according to the modification of the invention.

For example, in the foregoing embodiments, the case where the coil 13 is a rectangular spiral coil having the first and second coil parts almost orthogonal to each other has been described. The shape of the coil 13 as a thin film coil is not limited to the spiral shape. For example, like thin film inductors 1C to 1E shown in FIGS. 23A to 23C, respectively, magnetic films 14C to 14E may have a circular shape (or oval shape) and the coil 13 may be a circular spiral coil. In this case, irrespective of the shape of the coil 13, it is sufficient to form the slits 16 in the direction (the magnetization hard axis Mh direction) orthogonal to the magnetization easy axis Me. In other words, it is sufficient that the magnetic films 14C to 14E have the magnetization easy axis Me in the width direction of the plurality of slits 16. For example, like a thin film inductor 1F shown in FIG. 24, the coil 13 may not be a square coil but may be a rectangular spiral coil.

Figure 25:
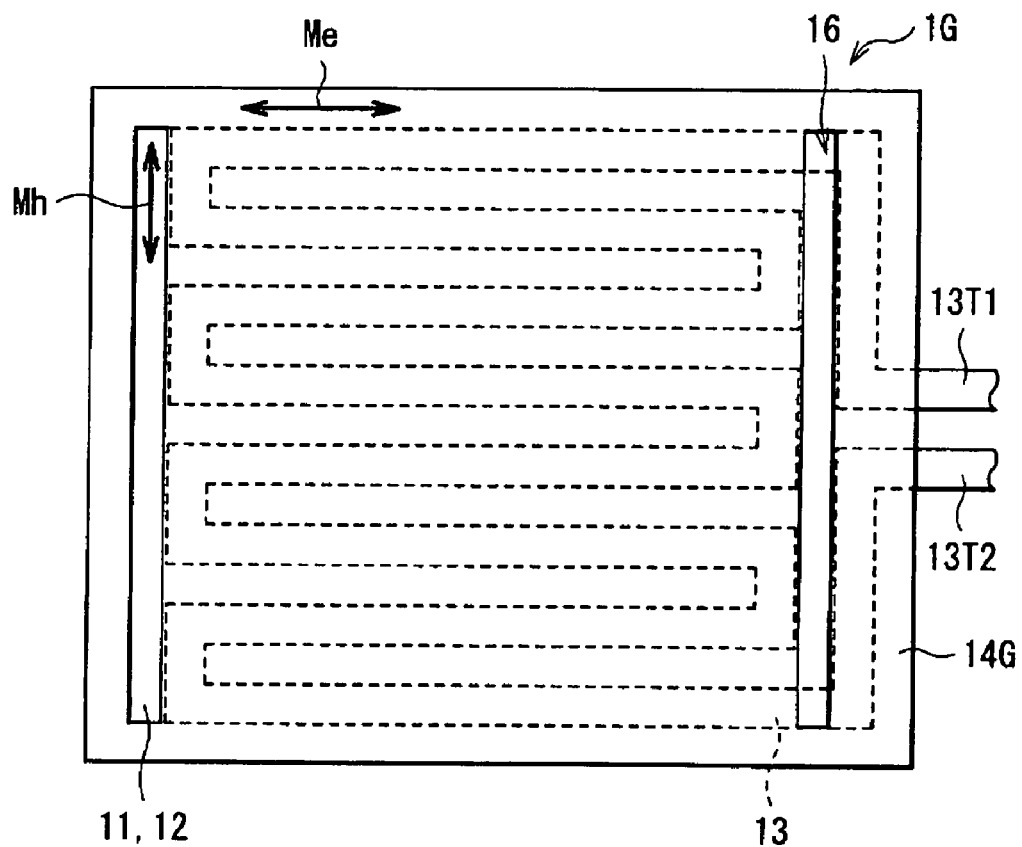
FIG. 25 is a plan view showing the configuration of the thin film magnetic device according to the modification of the invention.
Figure 26:
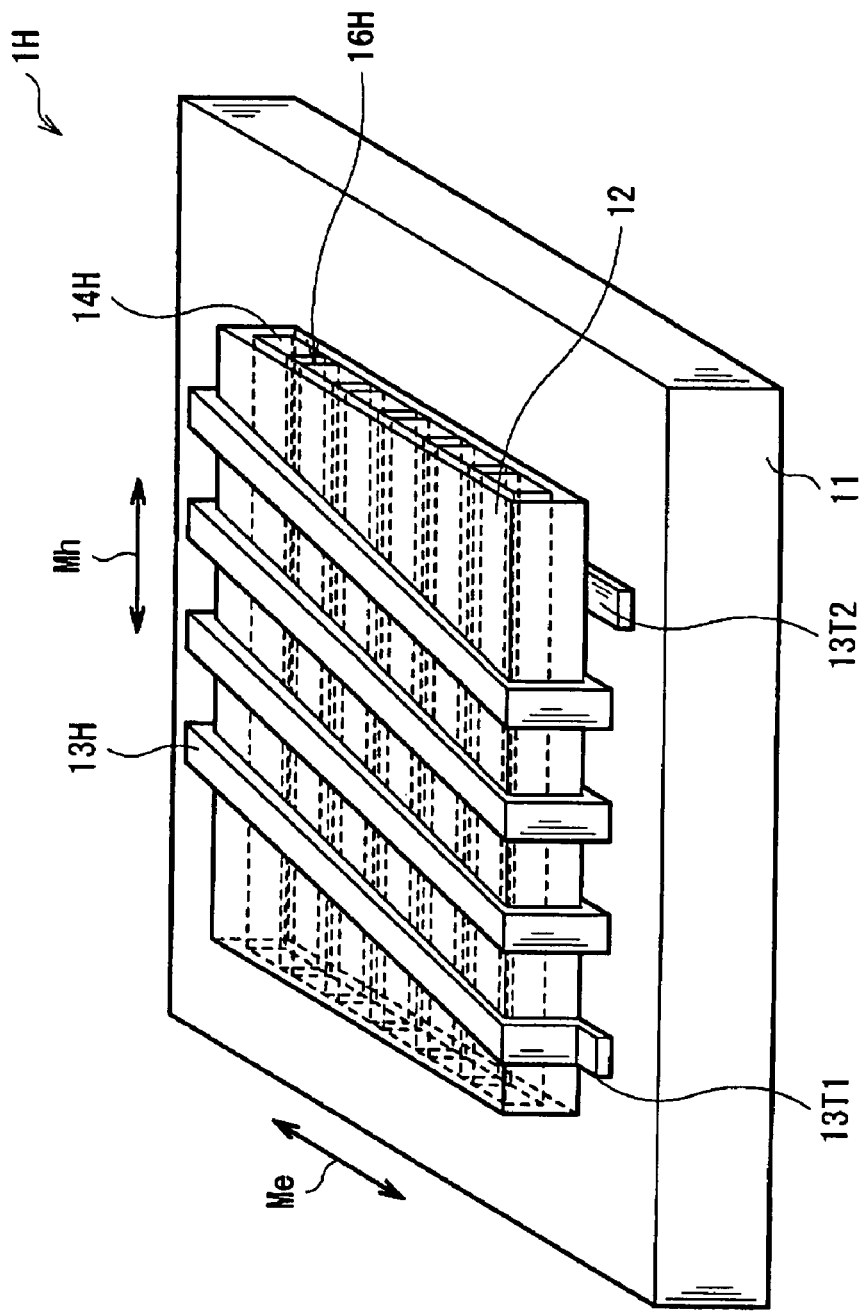
FIG. 26 is a plan view showing the configuration of the thin film magnetic device according to the modification of the invention.
Figure 27A:
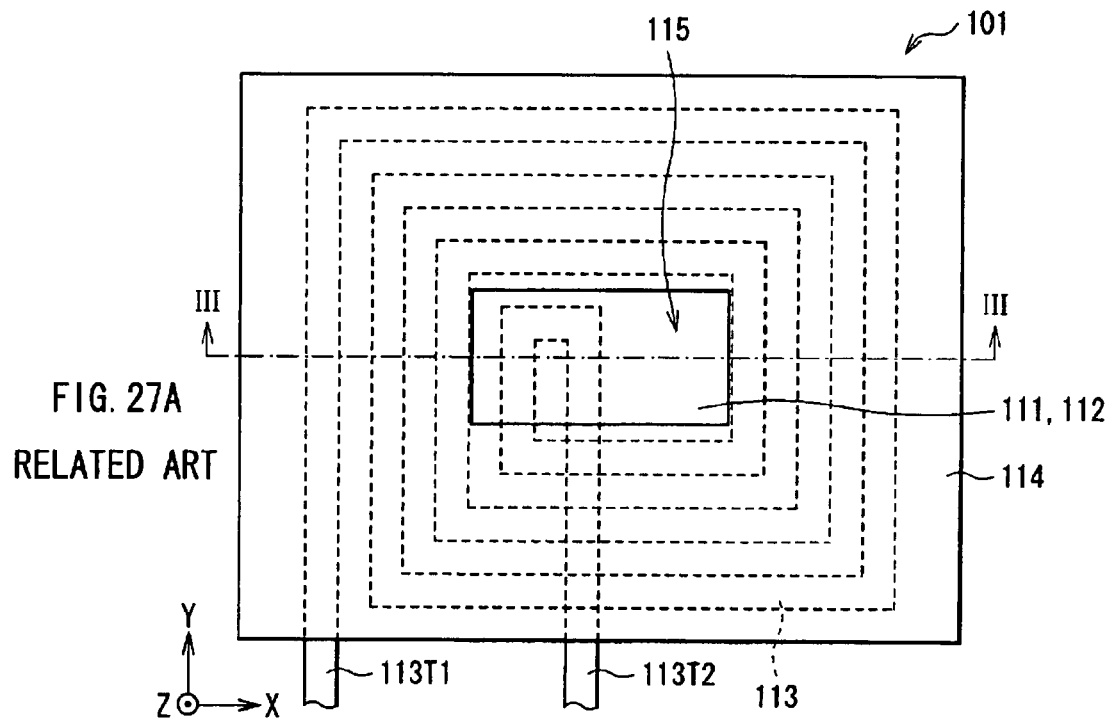
FIGS. 27A and 27B are plan view and cross section, respectively, showing the configuration of a conventional thin film magnetic device.
Figure 27B:
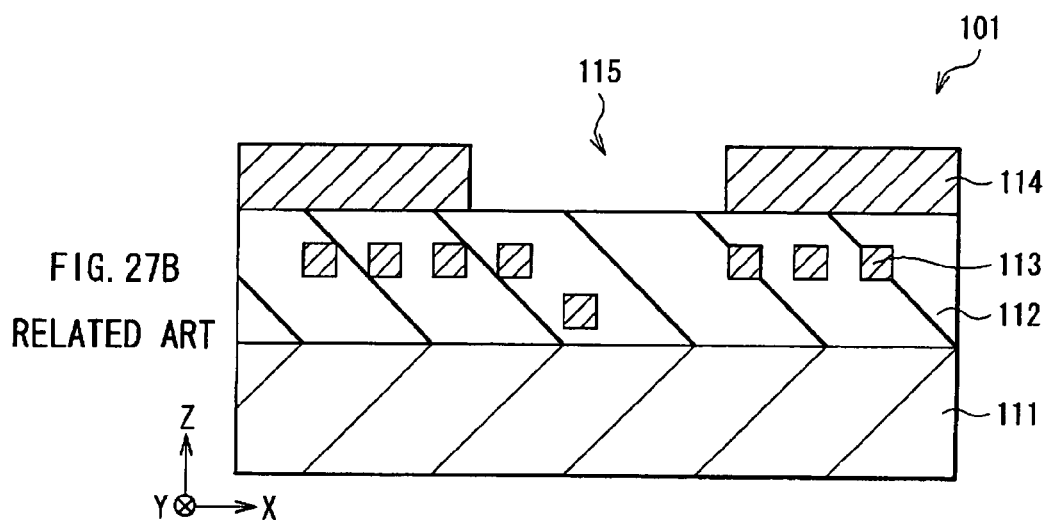

For example, like a thin film inductor 1G shown in FIG. 25, the coil may be a meander coil 13G having a rectangular shape. Like a thin film inductor 1H shown in FIG. 26, the coil may be a solenoid coil 13H.

In the foregoing embodiments, the thin film inductors have been described as an example of the thin film magnetic device. The present invention can be also applied to a thin film transformer and the like. As long as the magnetic film and a predetermined electrode described in the foregoing embodiments are provided, the invention is not limited to the thin film inductor but can be widely applied to thin film magnetic devices.

The invention is not limited to the materials of the layers, the film forming methods, the film formation parameters, and the like described in the foregoing embodiments. The other materials, thicknesses, film forming methods, and film forming parameters may be used.

Obviously, many modifications and variations of the present invention are possible in the light of the above teachings. It is therefore to be] understood that within the scope of the appended claims the invention may be practiced otherwise than as specifically described.

What is claimed is:

1. A thin film magnetic device comprising:
   a thin film coil, and
   a plurality of strip-shaped magnetic films disposed along a plane under which the thin film coil extends,
   wherein the plurality of strip-shaped magnetic films are disposed to extend in one direction only in a pair of areas opposite to each other, the pair of areas being selected from four areas obtained by dividing, in a winding direction, the four areas where the thin film coil extends, and
   a direction of a magnetization easy axis of the strip-shaped magnetic film coincides with a width direction of the strip-shaped magnetic film.

2. The thin film magnetic device according to claim 1, wherein the strip-shaped magnetic film is formed so as to overlap a turn pattern of the thin film coil.

3. A thin film magnetic device comprising:
a thin film coil; and
a magnetic film disposed along a plane under which the thin film coil extends,
wherein a plurality of slits extending in one direction are formed only in the magnetic film in a pair of areas opposite to each other, the pair of areas being selected from four areas obtained by dividing, in a winding direction, the four areas where the thin film coil extends, and
a direction of a magnetization easy axis of the magnetic film coincides with a width direction of the slit.

4. The thin film magnetic device according to claim 3, wherein the slit is formed in an area between turn patterns of the thin film coil.

5. A thin film magnetic device comprising:
a thin film coil; and
a plurality of strip-shaped magnetic films disposed along a plane under which the thin film coil extends, and extending in one direction in the plane,
wherein the strip-shaped magnetic film has a plurality of pairs of first magnetic domains lined up in a longitudinal direction of the strip-shaped magnetic film, each of the pairs of the first magnetic domains being disposed at both ends of the strip-shaped magnetic film in a width direction of the strip-shaped magnetic film, and
the first magnetic domain is magnetized in the longitudinal direction.

6. A thin film magnetic device according to claim 5, wherein the strip-shaped magnetic film has a plurality of pairs of second magnetic domains lined up in the longitudinal direction, each of the pairs of second magnetic domains being disposed between the pairs of first magnetic domains.

7. The thin film magnetic device according to claim 5, wherein the second magnetic domain is magnetized in the width direction.

8. The thin film magnetic device according to claim 5, wherein an area ratio of the first magnetic domains to the strip-shaped magnetic film is 12% or less.

9. A thin film magnetic device comprising:
a thin film coil; and
a magnetic film disposed along a plane under which the thin film coil extends and having a plurality of slits extending in one direction in the plane,
wherein in a strip-shaped area between neighboring slits in the magnetic film, a plurality of pairs of first magnetic domains are lined up in a longitudinal direction of the strip-shaped area, each of the pairs of first magnetic domains being disposed at both ends of the strip-shaped area in a width direction of the strip-shaped area, and
the first magnetic domain is magnetized in the longitudinal direction.

10. The thin film magnetic device according to claim 9, wherein in the strip-shaped area in the magnetic film, a plurality of pairs of second magnetic domains are lined up in the longitudinal direction, each of the pairs of second magnetic domains being disposed between the pairs of first magnetic domains.

11. The thin film magnetic device according to claim 9, wherein the second magnetic domain is magnetized in the width direction.

12. The thin film magnetic device according to claim 9, wherein an area ratio of the first magnetic domains to the strip-shaped area is 12% or less.

13. A thin film magnetic device comprising:
a thin film coil; and
a plurality of strip-shaped magnetic films disposed along a plane under which the thin film coil extends, and extending in one direction in a plane,
wherein the strip-shaped magnetic film has a plurality of pairs of magnetic domains lined up in a longitudinal direction of the strip-shaped magnetic film, and a longitudinal direction of the magnetic domain coinciding with a width direction of the strip-shaped magnetic film, and
the strip-shaped magnetic film is formed only in an area where a magnetization easy axis of the strip-shaped magnetic film and the thin film coil are orthogonal to each other, so that the longitudinal direction coincides with a direction orthogonal to the magnetization easy axis.

14. The thin film magnetic device according to claim 13, wherein the thin film coil includes:
a first coil part extending along the magnetization easy axis; and
a second coil part extending along the direction orthogonal, and
the strip-shaped magnetic films are formed along the second coil part.

15. The thin film magnetic device according to claim 13, wherein the width of the strip-shaped magnetic film lies in the range between 0.1 mm and 5 mm.

16. The thin film magnetic device according to claim 15, wherein the width of the strip-shaped film lies in the range between 0.3 mm and 2 mm.

17. The thin film magnetic device according to claim 16, wherein the width of the strip-shaped film lies in the range between 0.3 mm and 1 mm.

18. The thin film magnetic device according to claim 13, wherein a ratio of the length in the width direction of the magnetic domain to the length in the longitudinal direction of the magnetic domain is 0.3 or less.

19. A thin film magnetic device comprising:
a thin film coil; and
a magnetic film disposed along a plane under which the thin film coil extends and having a plurality of slits extending in one direction in a plane,
wherein in a strip-shaped area between the slits in the magnetic film, a plurality of pairs of magnetic domains are lined up in a longitudinal direction of the strip-shaped area, a longitudinal direction of the magnetic domain coinciding with a width direction of the strip-shaped area, and
the slits are formed only in an area where a magnetization easy axis of the magnetic film and the thin film coil are orthogonal to each other, so that the longitudinal direction of the slit coincides with a direction orthogonal to the magnetization easy axis.

20. The thin film magnetic device according to claim 19, wherein the thin film coil includes:
a first coil part extending along the magnetization easy axis; and
a second coil part extending along the direction orthogonal, and the slits are formed along the second coil part.

21. The thin film magnetic device according to claim 19, wherein the width of the strip-shaped area lies in the range between 0.1 mm and 5 mm.

22. The thin film magnetic device according to claim 21, wherein the width of the strip-shaped area lies in the range between 0.3 mm and 2 mm.

23. The thin film magnetic device according to claim 22, wherein the width of the strip-shaped area lies in the range between 0.3 mm and 1 mm.

24. The thin film magnetic device according to claim 19, wherein a ratio of the length in the width direction of the magnetic domain to the length in the longitudinal direction of the magnetic domain is 0.3 or less.

25. A method of manufacturing a thin film magnetic device, comprising:
  a first step of forming a thin film coil over a substrate, and
  a second step of forming, over the thin film coil, a plurality of strip-shaped magnetic films having a magnetization easy axis in a predetermined direction, the strip-shaped magnetic films being formed in an area where the magnetization easy axis and the thin film coil are orthogonal to each other, the longitudinal direction of the strip-shaped magnetic film coinciding with a direction orthogonal to the magnetization easy axis.

26. The method of manufacturing a thin film magnetic device according to claim 25, further comprising, after the second step, a step of performing heat treatment while applying a magnetic field rotating in the plane in which the strip-shaped magnetic films are disposed.

27. A method of manufacturing a thin film magnetic device, comprising:
  a first step of forming a thin film coil over a substrate, and
  a second step of forming, over the thin film coil, a magnetic film having a magnetization easy axis in a predetermined direction, the magnetic film having a plurality of slits in an area where the magnetization easy axis and the thin film coil are orthogonal to each other, the longitudinal direction of the slit coinciding with a direction orthogonal to the magnetization easy axis.

28. The method of manufacturing a thin film magnetic device according to claim 27, wherein the second step comprises:
  a step of forming the magnetic film over the thin film,
  a step of performing heat treatment while applying a magnetic field in a predetermined direction in a plane in which the magnetic film extends, and
  a step of forming the slits in a direction orthogonal to the application direction of the magnetic field in an area where the application direction of the magnetic field and the thin film coil are orthogonal to each other.

29. The method of manufacturing a thin film magnetic device according to claim 27, wherein the second step comprises:
  a step of forming the magnetic film over the thin film,
  a step of forming the slits in the magnetic film in parallel with a part of the thin film coil, and
  a step of performing heat treatment while applying a magnetic field in a direction orthogonal to the slit in a plane in which the magnetic film extends.

30. The method of manufacturing a thin film magnetic device according to claim 27, wherein the second step comprises:
  a step of forming the magnetic film over the thin film coil while applying a magnetic field in a predetermined direction in a plane in which the magnetic film extends, and
  a step of forming the slits in the magnetic film in an area where the application direction of the magnetic field and the thin film coil are orthogonal to each other, the slits extending in a direction orthogonal to the application direction of the magnetic field.

31. The method of manufacturing a thin film magnetic device according to claim 27, further comprising, after the second step, a step of performing heat treatment while applying a magnetic field rotating in the plane in which the magnetic film is disposed.

* * * * *